(12) United States Patent
Achiwa

(10) Patent No.: US 9,600,747 B2
(45) Date of Patent: Mar. 21, 2017

(54) IMAGE FORMING APPARATUS AND CONTROL METHOD THAT EXECUTE A PLURALITY OF RENDERING PROCESSING UNITS IN PARALLEL

(71) Applicant: CANON KABUSHIKI KAISHA, Tokyo (JP)

(72) Inventor: Ken Achiwa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/045,568

(22) Filed: Feb. 17, 2016

(65) Prior Publication Data

US 2016/0253129 A1    Sep. 1, 2016

(30) Foreign Application Priority Data

Feb. 26, 2015  (JP) ................................. 2015-037295

(51) Int. Cl.
*G06K 15/00*    (2006.01)
*G06F 3/12*     (2006.01)

(52) U.S. Cl.
CPC .................................. *G06K 15/00* (2013.01)

(58) Field of Classification Search
CPC ........ G06F 3/124; G06F 3/125; G06F 3/1248; G06F 3/1203; G06F 3/1217; G06K 9/00463
USPC ............. 358/1.1, 1.13, 1.15, 1.16, 1.18, 448
See application file for complete search history.

(56) References Cited

U.S. PATENT DOCUMENTS

| | | | |
|---|---|---|---|
| 8,294,912 B2 | 10/2012 | Matsui et al. | |
| 2005/0206653 A1* | 9/2005 | Beaumont | G06T 11/40 345/629 |
| 2007/0211078 A1* | 9/2007 | Satoh | G06T 11/40 345/613 |
| 2008/0273218 A1* | 11/2008 | Kitora | H04N 1/40062 358/1.13 |
| 2012/0170871 A1* | 7/2012 | Ishikawa | G06T 1/20 382/305 |

FOREIGN PATENT DOCUMENTS

JP         2000-132350 A      5/2000

* cited by examiner

*Primary Examiner* — Gabriel Garcia
(74) *Attorney, Agent, or Firm* — Fitzpatrick, Cella, Harper & Scinto

(57) ABSTRACT

An image forming apparatus includes rendering units that refer to rendering data composing partial regions within a page as input data, generates image data by merging the rendered results, and uses the image data as output data. Each rendering unit holds a rendering position of processing that is currently executed by itself, and detects a rendering position of processing that is currently executed by another rendering unit. When rendering for a partial region that is currently processed is completed, a control unit detects a rendering position held in another rendering unit, and changes allotment of a partial region serving as the next rendering target of its rendering unit so as to reduce the difference between time periods until its rendering unit and another rendering unit complete rendering for the next partial region.

14 Claims, 16 Drawing Sheets

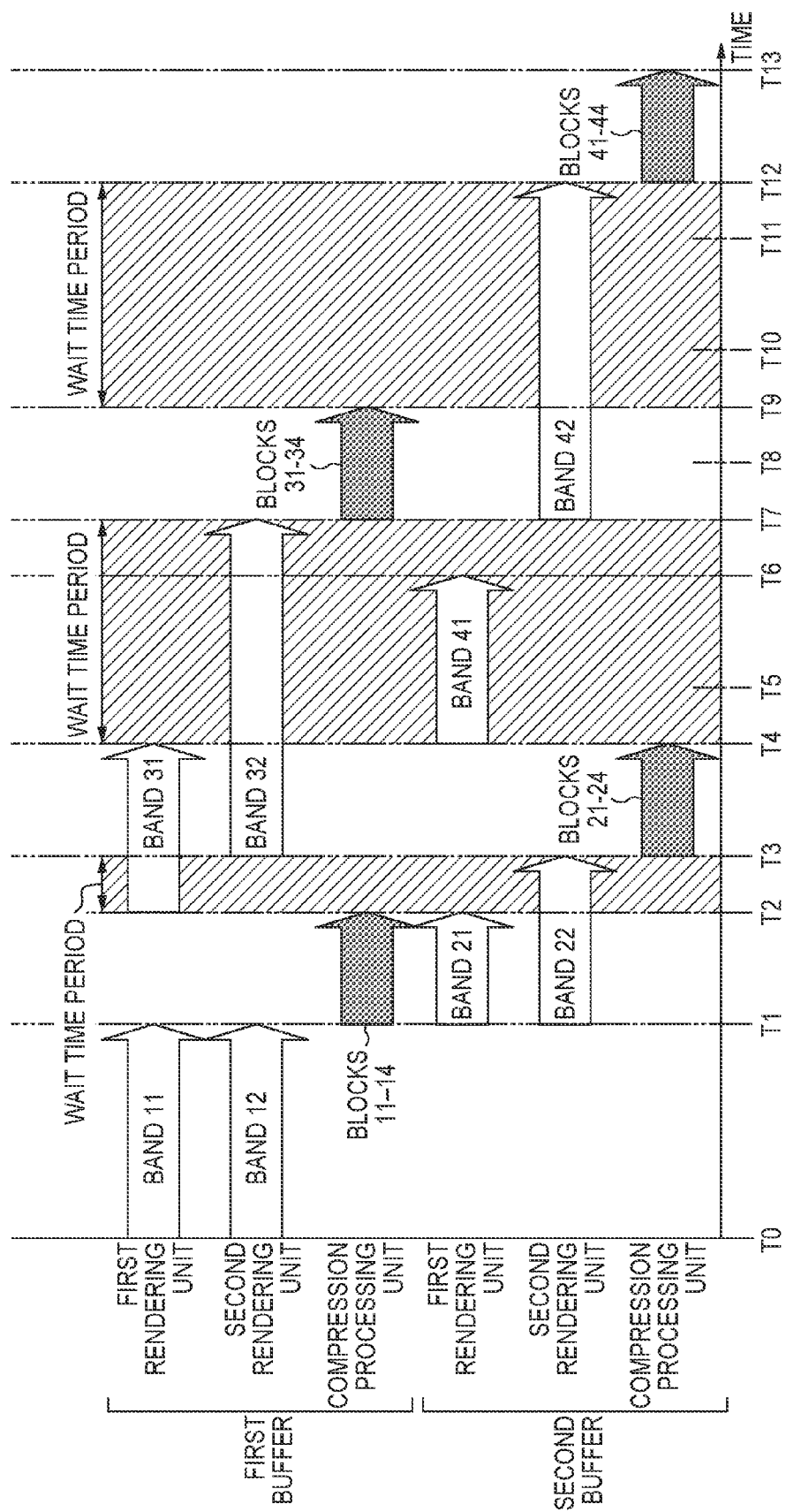

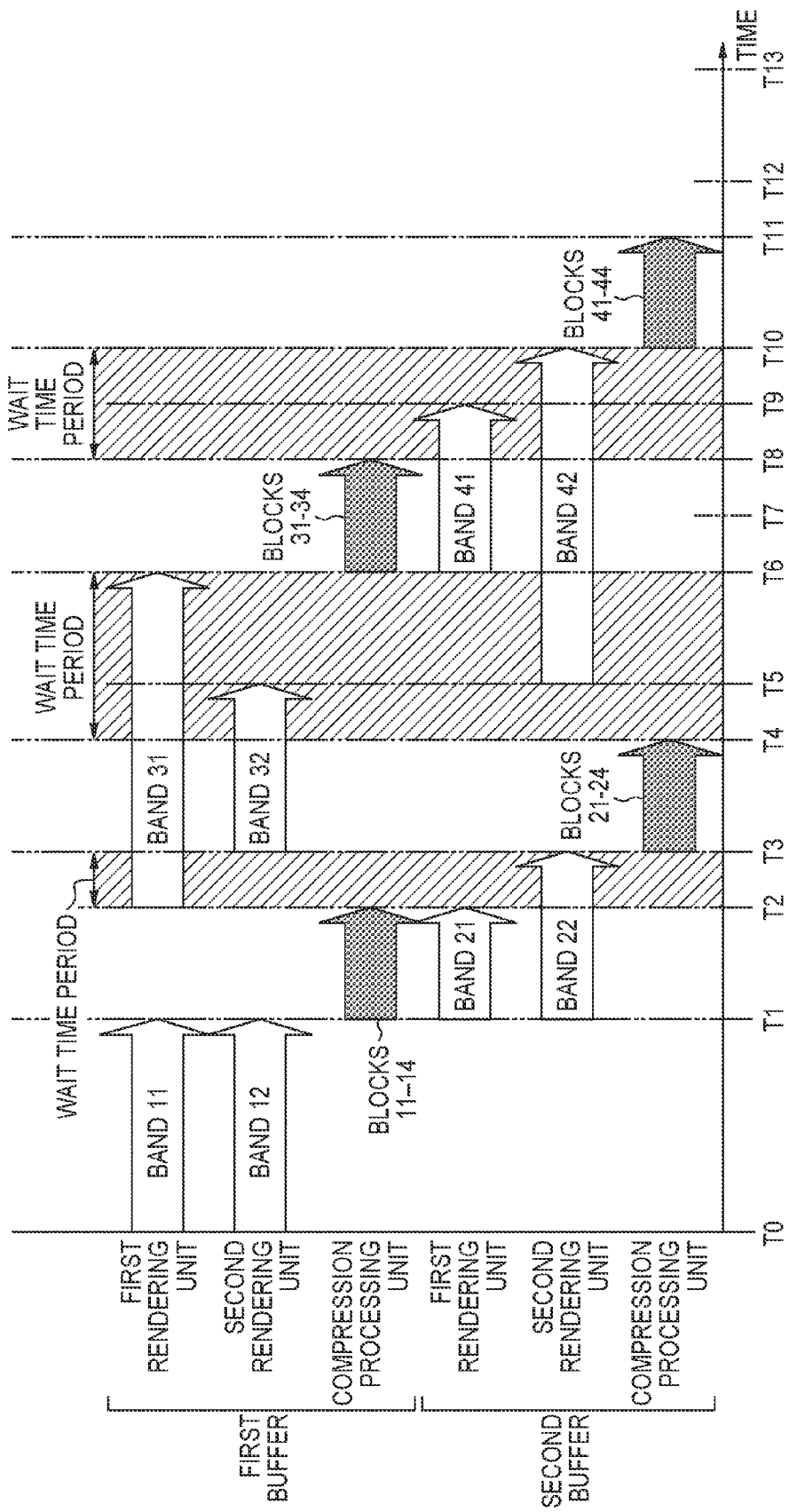

IMAGE FORMING APPARATUS AND CONTROL METHOD THAT EXECUTE A PLURALITY OF RENDERING PROCESSING UNITS IN PARALLEL

BACKGROUND OF THE INVENTION

Field of the Invention

The present invention relates to an image forming apparatus that executes rendering processing and the like in parallel using, for example, a plurality of rendering processing units, and to a control method therefor.

Description of the Related Art

There are demands to increase the speeds of various types of image processing in an image forming apparatus, including rendering processing (RIP) for forming raster-format image data by interpreting vector-format rendering data generated by a host computer or the like and described in a page description language (PDL). Generally, rendering processing may require a large amount of computation depending on the complexity of rendering objects, such as characters, photographs, and graphics, included in rendering data. One known effective method to increase the speed of such image processing is to cause a plurality of image processing units to operate in parallel with respect to image data obtained by dividing a single page into predetermined partial regions. However, rendering processing that handles vector-format rendering data is not necessarily increased in speed in accordance with the number of rendering processing units due to overhead induced by the division, and thus makes it necessary to increase the efficiency of parallel processing by maximizing the processing capabilities of the plurality of rendering processing units. For example, in view of the properties of a rendering processing algorithm (a scanline method), it is preferable to execute band-based parallel processing by dividing a page into partial regions in a sub scanning direction (i.e., division lines are along main scanlines), which reduces division-induced overhead in rendering processing compared to a main scanning direction. In this way, processing that is additionally required in parallel execution of rendering processing (e.g., processing for skipping the reading of rendering data, and buffering) can be kept to the minimum. In addition, for example, it is preferable to execute parallel processing by performing the division into partial regions in such a manner that a division width corresponds to a band unit so as to minimize the difference between processing time periods of the plurality of rendering processing units that operate in parallel. In this way, each of the plurality of rendering processing units that execute parallel processing by dividing a rendering processing region can operate without waiting for completion of rendering processing by a slow rendering processing unit(s) as long as possible. For example, Japanese Patent Laid-Open No. 2000-132350 discloses the following technique: when executing parallel processing by dividing a rendering processing region, a predicted load value is calculated on a per-scanline basis, and division based on the predicted load values and fixed-width division are combined in allotting the rendering processing region.

Although the technique described in Japanese Patent Laid-Open No. 2000-132350 can increase the efficiency of parallel processing through well-balanced allotment of band units to a plurality of rendering processing units on the basis of load prediction, it has the problem of requiring new load prediction processing before allotting the band units. Generally, this load prediction processing obtains the frequencies of appearance of characteristic amounts (e.g., edges and levels) of a rendering object targeted for rendering processing contained in intermediate data (DL), and calculates the products of the frequencies and a unit processing time period as predicted load values. Therefore, in the case of complex rendering data, the load prediction processing takes long, and the intended start of rendering processing could possibly be delayed due to the wait for completion of the load prediction processing. Furthermore, as the load prediction processing faces tradeoff between the precision and the speed, it has the problem of extending a prediction time period when excessively simulating the actual rendering processing to increase the precision, and of reducing the precision when excessively simplified.

SUMMARY OF THE INVENTION

The present invention provides an image forming apparatus and a control method therefor that can prevent an increase in the difference between processing time periods of a plurality of rendering processes that are executed in parallel, increase the processing efficiency by increasing the operation rate through reduction in a wait time period, and thus shorten a time period for rendering.

An image forming apparatus of the present invention is configured as follows.

According to one aspect of the present invention, there is provided an image forming method for generating a raster image of a page using at least first renderer and second renderer, comprising: setting dimensions of first and second areas to be rendered of a first partial region of the page; generating a raster image for the first area to be rendered by the first renderer; generating a raster image for the second area to be rendered by the second renderer; setting dimensions of third and fourth areas to be rendered of a second partial region of the page according to a dimension of an area of which no raster image has been generated at a time of completion of generation of a raster image for the first area to be rendered by the first renderer, the second partial region being different than the first partial region; generating a raster image for the third area by the first renderer after completion of generation of a raster image for the first area to be rendered; and generating a raster image for the fourth area by the second renderer after completion of generation of a raster image for the second area to be rendered.

According to another aspect of the present invention, there is provided an image forming apparatus, comprising: a plurality of renderers that are capable of operating in parallel, and share generation of image data of a partial region having a predetermined height in such a manner that each renderer handles a different one of rendering target regions obtained by dividing the partial region, wherein an amount of image data that has not been generated yet within the partial region at a time when generation of image data of one of the rendering target regions obtained by dividing the partial region is completed first is allotted to the plurality of renderers, and for each renderer, an amount of image data obtained by adding an allotted amount to an amount of image data that has already been generated by the renderer at the time is set as a rendering target region in a next partial region.

As the present invention performs control to reduce the difference between processing time periods of a plurality of rendering processing units on the basis of rendering positions actually measured during rendering processing without relying on predicted load values predicted before the rendering processing, a wait time period faced by each rendering processing unit can be shortened, and the efficiency of parallel processing can be increased.

Further features of the present invention will become apparent from the following description of exemplary embodiments with reference to the attached drawings.

BRIEF DESCRIPTION OF THE DRAWINGS

FIGS. 13A and 13B are timing charts showing parallel rendering processing.

DESCRIPTION OF THE EMBODIMENTS (First Embodiment)
<Configuration of Image Forming Apparatus>

Figure 1:
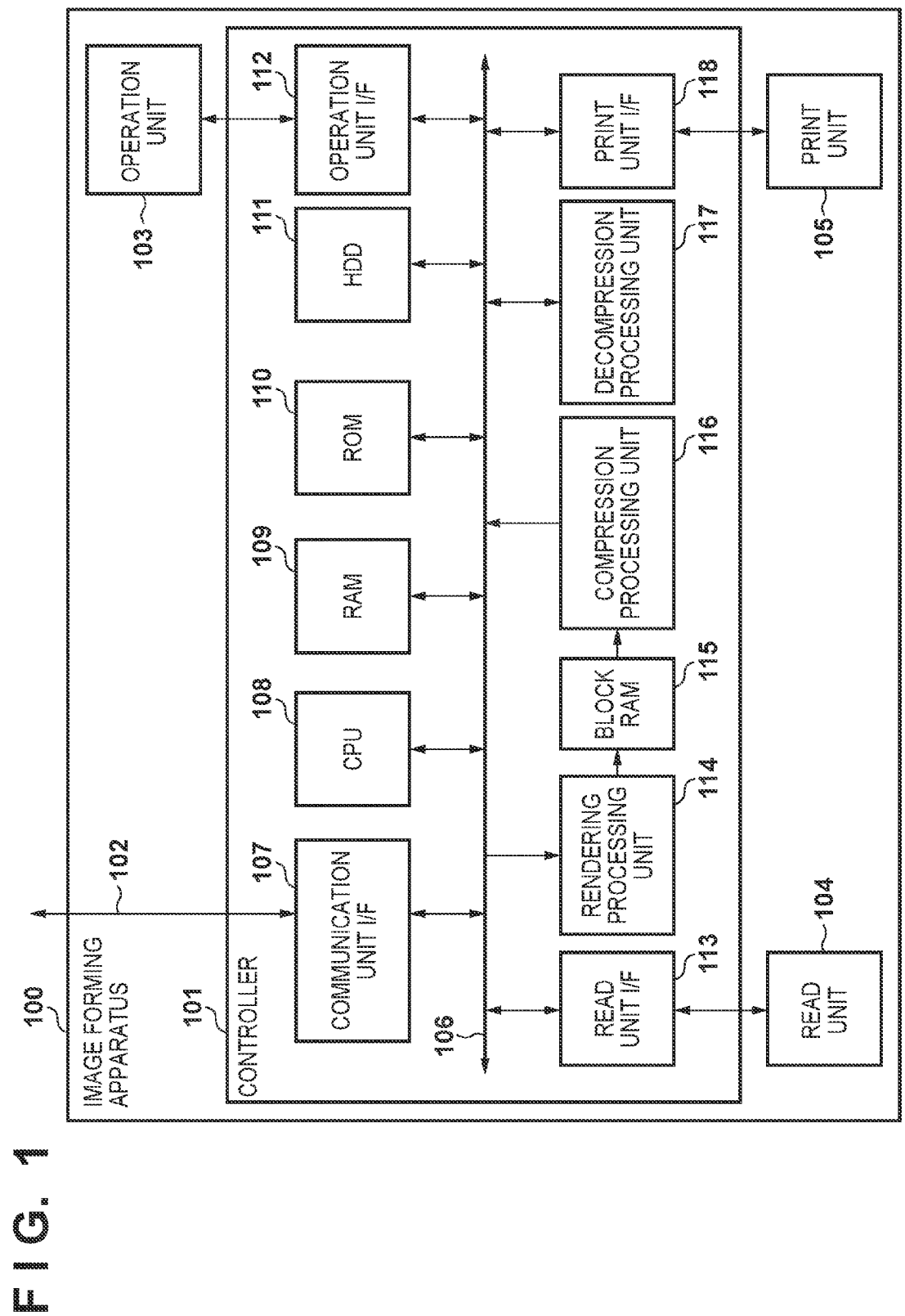
FIG. 1 shows a configuration of an image forming apparatus according to a first embodiment.

The following describes an embodiment of the present invention with reference to the drawings. FIG. 1 shows an exemplary configuration of an image forming apparatus according to a first embodiment of the present invention. As shown in FIG. 1, an image forming apparatus 100 includes a controller 101, a network 102, an operation unit 103, a read unit 104, and a print unit 105. The network 102 is realized by a LAN, a WAN (public line), or the like, and serves as a communication unit that exchanges image data and device information between an external apparatus, such as a host computer and a server, and the image forming apparatus 100. The operation unit 103 is a processing unit that obtains a user operation as control information for image processing, and displays control information for image processing to a user. The read unit (scanner engine) 104 is an image input device, specifically, a processing unit that imports image data into the image forming apparatus 100 using, for example, an optical sensor. The print unit (printer engine) 105 is an image output device, specifically, a processing unit that prints image data within the image forming apparatus 100 on a recording medium and outputs the recording medium.

The controller 101 is a control unit that is connected to the network 102, the operation unit 103, the read unit 104, and the print unit 105, and controls the entire image forming apparatus 100. The controller 101 includes a system bus 106, a communication unit I/F 107, a CPU 108, a RAM 109, a ROM 110, an HDD 111, an operation unit I/F 112, a read unit I/F 113, image processing units 114 to 117, and a print unit I/F 118. The system bus 106 is a processing unit for connecting various processing units composing the controller 101, and exchanging image data and control information among various processing units. The communication unit I/F 107 is realized by a LAN card or the like, and serves as an interface unit for exchanging image data and device information between an external apparatus, such as a host computer and a server, and the image forming apparatus 100 via the network 102. The CPU 108 is a processing unit that controls the entire image forming apparatus 100; especially in PDL print processing, it interprets PDL data received from an external apparatus via the network 102, and converts the PDL data into intermediate data called a display list (DL). The RAM (volatile memory) 109 is a storage unit that is used as a working area for the CPU 108 to operate on a system, and as a buffer area for primarily storing image data. The ROM (nonvolatile memory) 110 is a primary storage unit storing a program with which the CPU 108 activates the system. This program is deployed to the RAM 109 and executed by the CPU 108 when activating the image forming apparatus 100. The HDD (hard disk drive) 111 is a large-capacity storage unit for storing image data within the image forming apparatus 100. The operation unit I/F 112 is an interface unit for obtaining a user operation as control information for image processing, and displaying control information for image processing to the user. The read unit I/F (scan image processing unit) 113 is an image processing unit that is connected to the read unit (scanner engine) 104 and applies image processing for correction appropriate for the device properties of the read unit 104 to image data input from the read unit 104.

A rendering processing unit (RIP) 114 is an image processing unit that refers to vector-format intermediate data (a display list or DL) generated by the CPU 108 on the basis of PDL data, and renders the intermediate data as raster-format image data. A block RAM 115 is a local memory that primarily holds the raster-format image data output from the rendering processing unit 114. A compression processing unit 116 is an image processing unit that applies compression processing to the raster-format image data primarily held in the block RAM 115. A decompression processing unit 117 is an image processing unit that applies decompression processing to compressed image data obtained through the compression processing by the compression processing unit 116. The print unit I/F (print image processing unit) 118 is an image processing unit that is connected to the print unit (printer engine) 105, and outputs image data to the print unit 105 after executing image processing for correction appropriate for the device properties of the print unit 105. Note that the operations of the rendering processing unit 114, the block RAM 115, and the compression processing unit 116 that are involved with rendering processing in PDL printing will be described in detail with reference to FIG. 3.

<Data Flow in PDL Print Processing>

Figure 2:
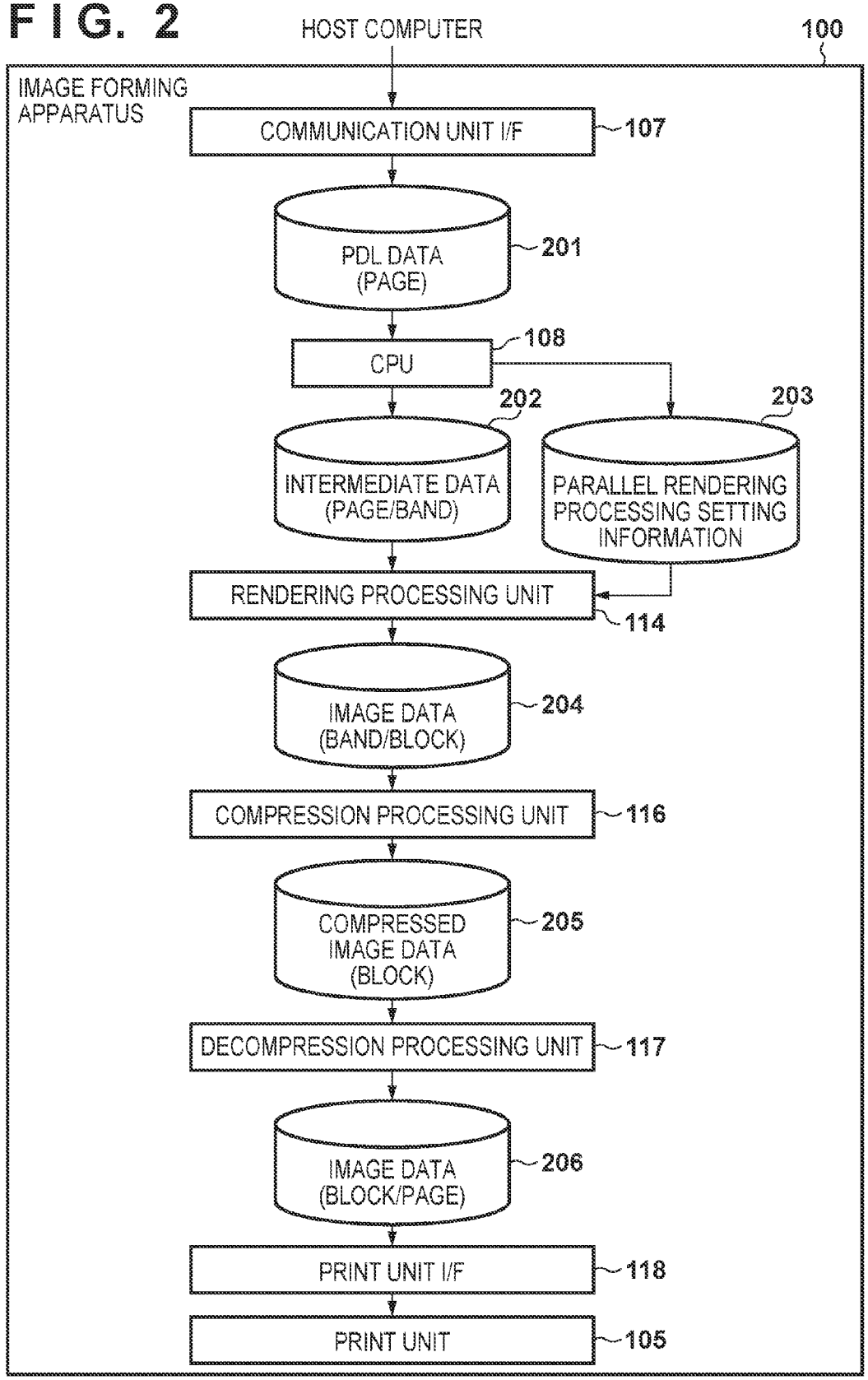
FIG. 2 shows a data flow in PDL print processing of the image forming apparatus according to the first embodiment.
Figure 12A:
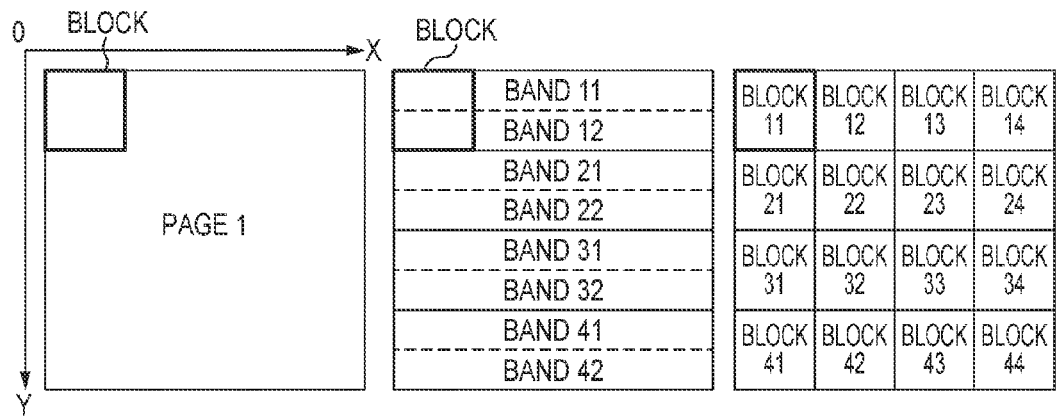
FIGS. 12A, 12B, and 12C show examples of coordinate systems of a rectangular region within a page handled by an image forming apparatus.
Figure 12B:
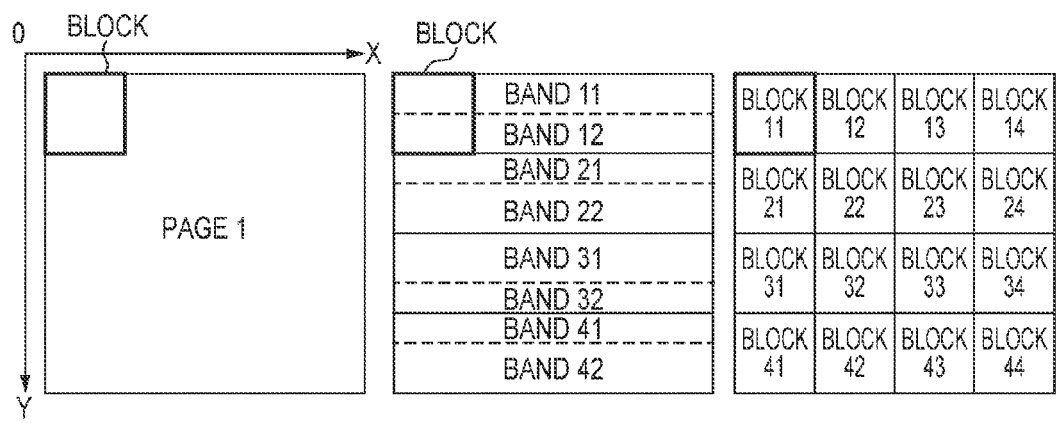
Figure 12C:
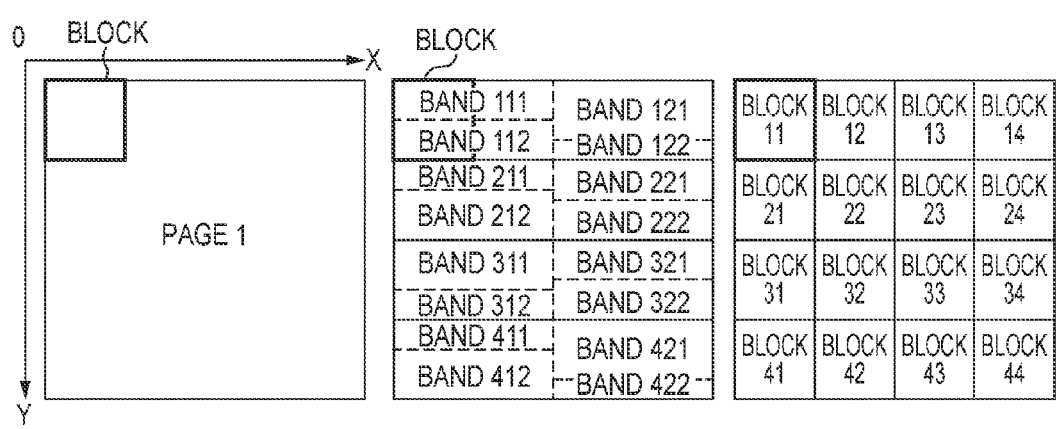

A description is now given of a data flow and relationships between image data units in PDL print processing of the image forming apparatus 100 with reference to FIG. 2 and FIGS. 12A to 12C. FIG. 2 shows a data flow in PDL print processing of the image forming apparatus 100. FIGS. 12A to 12C show examples of coordinate systems of a rectangular region within a page handled by the image forming apparatus 100. It will be assumed that the data flow of FIG. 2 is realized by the CPU 108 executing the program deployed to the RAM 109 when activating the image forming apparatus 100. As shown in FIG. 2, the image forming apparatus 100 receives PDL data transmitted from a host computer via the communication unit I/F 107, and stores the PDL data as page-based PDL data 201 to the RAM 109 or the HDD 111. Next, the CPU 108 generates page- or band-based intermediate data (DL) 202 by interpreting the received PDL data 201, and stores it to the RAM 109 again.

As shown in FIGS. 12A and 12B, bands are strip-like rectangular regions formed by dividing a single page in a sub scanning direction. Normally, one band contains a smaller number of pixels along the sub scanning direction than a main scanning direction; however, no limitation is intended in this regard. On the other hand, as shown in FIGS. 12A and 12B, blocks are rectangular regions that are preset in the image forming apparatus 100 and each have a shape of a square tile, and one block has the same number of pixels along the main scanning direction and the sub scanning direction. FIGS. 12A and 12B depict image data units that are favorable in parallel execution of rendering processing in the present embodiment, and the following relationship exits therebetween: a block and a band are not included within each other, and the number of pixels in a block in the sub scanning direction (i.e., a height of a block) is divided in accordance with a height(s) of a plurality of bands (i.e., a band height(s)). In other words, division into bands is performed so that a border of a block matches a border of a band in the sub scanning direction (a height direction). The difference between FIGS. 12A and 12B is that one shows bands with a fixed height and the other shows bands with a variable height. That is to say, in FIG. 12A, a plurality of bands each have a fixed height obtained by equally dividing a predetermined number of lines equivalent to a height of a block having a predetermined size (e.g., a block of 32×32 pixels overlaps two bands each including 16 lines obtained by equally dividing a height of the block (32 pixels) into two). On the other hand, in FIG. 12B, a plurality of bands each have a variable height obtained by unequally dividing a predetermined number of liens equivalent to a height of a block (e.g., a block of 32×32 pixels overlaps two bands that include 8 lines and 24 lines, respectively). Specifically, in a single page 1, the number of pixels in a single block 11 in the sub scanning direction (e.g., 32 pixels) is divided in accordance with a height of a plurality of bands 11 and 12 (e.g., 16 lines each). Also, in a single page 1, the number of pixels in a single block 21 in the sub scanning direction (e.g., 32 pixels) is divided in accordance with heights of a plurality of bands 21 and 22 (e.g., 8 lines and 24 lines). It will be assumed that the following description of the embodiments is based on band units and block units within a page shown in FIG. 12B. In the examples of FIGS. 12A to 12C, blocks arrayed in the main scanning direction (e.g., blocks 11 to 14) are divided into two bands (e.g., bands 11, 12) because the rendering processing unit 114 according to the present embodiment is capable of processing two pieces of image data in parallel. Although the present embodiment will hereinafter be described under the assumption that two bands are processed in parallel, the rendering processing unit 114 may be capable of processing three or more bands in parallel, in which case a partial region having a block height is divided into bands in accordance with the number of bands (e.g., images) that can be processed in parallel by the rendering processing unit 114. By thus dividing a height of a block in accordance with a width(s) of bands that can be processed in parallel, blocks targeted for subsequent processing (e.g., compression processing) can be generated efficiently.

The CPU 108 generates rendering processing setting information 203 related to parallel operations of the rendering processing unit 114, and sets it in, for example, a register within the rendering processing unit 114. The rendering processing unit 114 includes rendering units that can operate in parallel, and the rendering processing setting information 203 contains, for example, information that specifies the start lines and heights of bands generated by the rendering units. The details will be described with reference to FIG. 8. In response to the setting, the rendering processing unit (RIP) 114 refers to rendering data contained in the intermediate data (DL) 202, generates image data 204 through parallel execution of rendering processing with respect to a plurality of band-based rectangular regions within a single page, and temporarily holds it in the block RAM 115. Subsequently, the compression processing unit 116 merging pieces of band-based image data held in the block RAM 115, reads out block-based image data, generates compressed image data 205 by executing compression processing based on JPEG or the like, and stores it to the RAM 109 or the HDD 111 again. Furthermore, the decompression processing unit 117 generates page-based image data 206 by merging all block units composing the single page through application of decompression processing based on JPEG or the like to the compressed image data 205 obtained by block-based compression, and stores it to the RAM 109 again. Thereafter, the print unit I/F 118 reads out the page-based image data 206 held in the RAM 109, executes image processing for correction appropriate for the device properties of the print unit 105, and then outputs the resultant image data to the print unit 105. In response, the print unit (printer engine) 105 prints the image data transferred from the print unit I/F 118 on a recording medium, and outputs the recording medium.

<Rendering Processing in PDL Printing>

Figure 3:
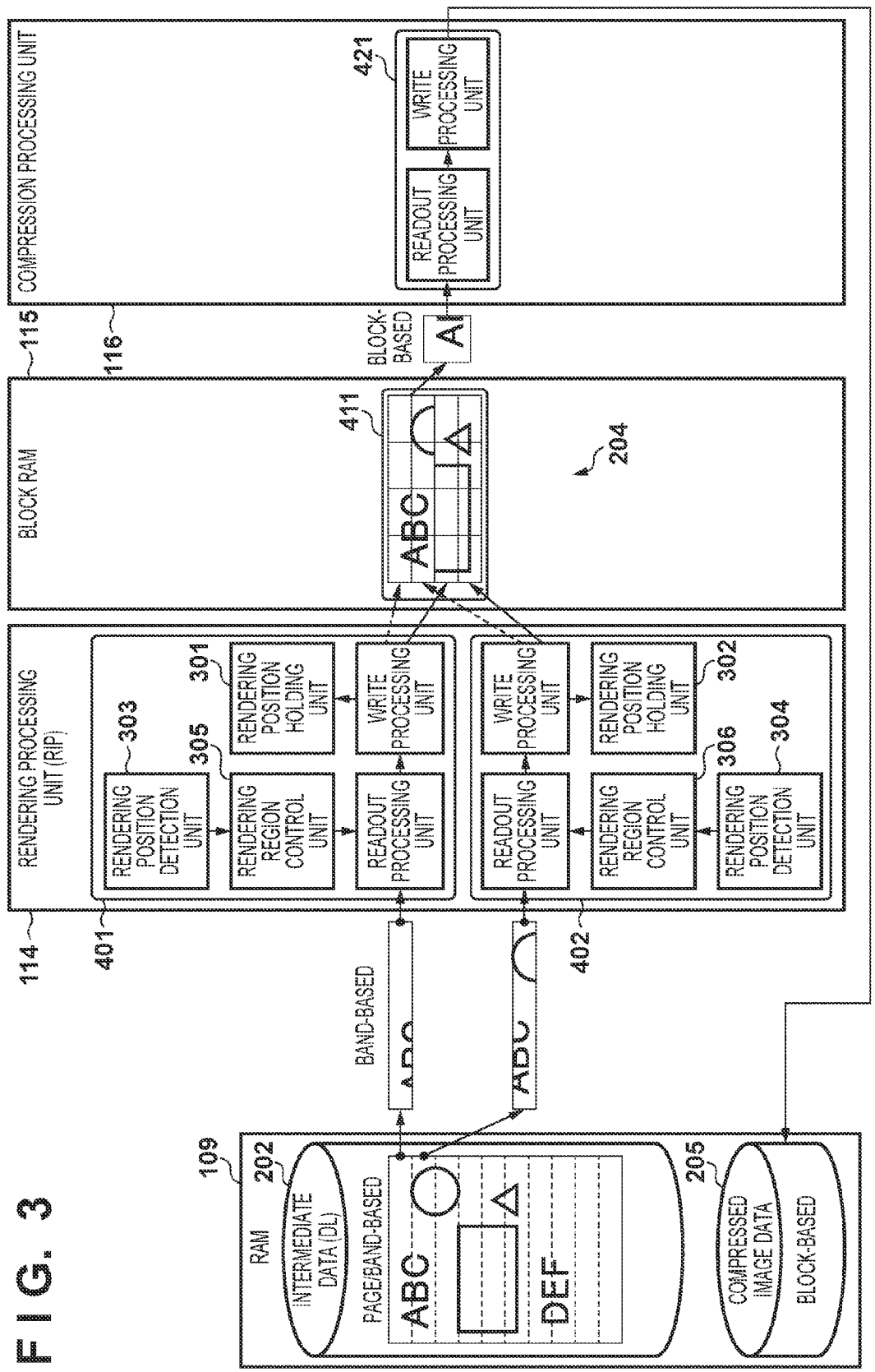
FIG. 3 shows a block configuration related to rendering processing according to the first embodiment.

A description is now given of the operations of rendering processing in PDL printing in the present invention with reference to FIG. 3. FIG. 3 shows the internal operations in which band-based rendering processing is executed in parallel with respect to the intermediate data (DL) 202 held in the RAM 109, and then the block-based compressed image data 205 is stored to the RAM 109 again.

FIG. 3 shows an example in which a rectangular region representing a block unit is not included within a rectangular region representing a band unit, and the number of pixels in a block unit in the sub scanning direction is divided in accordance with a height(s) of a plurality of band units based on the number of parallel operations of the rendering processing unit 114, as in FIGS. 12A and 12B. That is to say, FIG. 3 shows an example in which a rectangular region (also referred to as a partial region) obtained by merging consecutive blocks along the main scanning direction is divided into bands that correspond in number to rendering units that can operate in parallel. In FIG. 3, the image forming apparatus 100 renders a plurality of bands within a single page in parallel using a first rendering unit 401 and a second rendering unit 402 that compose the rendering processing unit 114. The first rendering unit 401 executes rendering processing with respect to odd-numbered bands within the single page, skips reading of even-numbered bands, and only updates positional coordinates of rendering objects on a per-scanline basis. The second rendering unit 402 executes rendering processing with respect to even-numbered bands within the single page, skips reading of odd-numbered bands, and only updates positional coordinates of rendering objects on a per-scanline basis. As such, each of the first rendering unit 401 and the second rendering unit 402 obtains rendering objects targeted for rendering processing on a band-by-band basis, and thus the intermediate data (DL) 202 primarily stored in the RAM 109 may be page-based or band-based. Next, the first rendering unit 401 sequentially outputs, to a block RAM 411 composing the block RAM 115, band-based image data corresponding to odd-numbered bands, such as a band 11 and a band 21 shown in FIG. 12B. On the other hand, the second rendering unit 402 sequentially outputs, to the block RAM 411 composing the block RAM 115, band-based image data corresponding to even-numbered bands, such as a band 12 and a band 22 shown in FIG. 12B. Subsequently, a compression processing unit 421 in the compression processing unit 116 sequentially reads out image data on a block-by-block basis from a rectangular region obtained by merging the bands 11 and 12 shown in FIG. 12B, which are primarily stored in the block RAM 411, executes compression processing, and then transfers the result of compression processing to the RAM 109. The block RAM 411 is composed of two buffers that allow writing and readout to be performed simultaneously. Therefore, for example, writing processing by the first rendering unit 401 and the second rendering unit 402 with respect to the bands 21 and 22, and readout processing by the compression processing unit 421 with respect to the blocks 11 to 14 within the merged bands 11 and 12, can be executed simultaneously.

In order to execute the foregoing processing, each rendering unit of the rendering processing unit 114, e.g., the first rendering unit 401 includes a rendering position holding unit 301, a rendering position detection unit 303, and a rendering region control unit 305. The same goes for the second rendering unit 402. The rendering position holding unit 301 holds a rendering position of ongoing generation by the first rendering unit 401. The rendering position is indicated by, for example, a line number of a main scanline at which image data is being generated in a partial region, i.e., a band to be rendered. The rendering position is an index value for determining a ratio of an amount of data being generated at a certain point to an amount of data targeted for rendering processing; therefore, as long as this purpose is fulfilled, the rendering position may not specifically be a line number, or may be replaced by other data. As each rendering unit stores generated image data of bands alternately to two buffers in the present embodiment, it is preferable to provide the rendering position holding unit on a buffer-by-buffer basis. The rendering position detection unit 303 refers to a rendering position holding unit 302 of the second rendering unit 402, and detects a rendering position of the second rendering unit 402 in a current partial region. On the other hand, a rendering position detection unit 304 of the second rendering unit 402 refers to the rendering position holding unit 301 of the first rendering unit 401, and detects a rendering position of the first rendering unit 401 in a current partial region. The rendering region control unit 305 obtains the detected rendering position, and on the basis of the rendering position, determines a fraction to be processed by the first rendering unit out of a partial region (bands having a height of one block) to be rendered next. Similarly, a rendering region control unit 306 determines a fraction to be processed by the second rendering unit. Once a fraction has been determined by one rendering region control unit 306, the other rendering region control unit will process the rest; therefore, it is sufficient that a fraction be determined by the first rendering unit to complete rendering processing.

<Display List and Rendering Processing>

Below is a more detailed description of the display list and the rendering processing by the first rendering unit 401 and the second rendering unit 402. For example, the display list, which is intermediate data, contains (describes) page-based vector objects together with information indicating their positions and levels. Each rendering unit generates image data (raster data) by executing rendering processing (scanline rendering) with respect to input rendering objects in accordance with their positions and levels. Rendering processing is roughly categorized into four types: edge processing, level processing, fill processing, and composite processing.

Edge processing is roughly categorized into five types of processing: edge loading, X-coordinate calculation, edge sorting, edge tracking, and edge deletion. Edge loading is processing to load edge information from the display list to a memory. Edge information is vector information indicating the outlines of vector objects. Next, X-coordinate calculation processing is executed to calculate the X-coordinates of edges on each scanline on the basis of the loaded edge information using the inclinations of the edges and painting rules. Edge information of edges that appear on a scanline in process is sorted in a link list called an active edge list (AEL) in the ascending order of X-coordinates in the main scanning direction. When edges cross each other or when a new edge appears/disappears, it is necessary to re-sort and update link information in the AEL; this is referred to as edge sorting. Upon completion of edge sorting, processing for passing the edges and their level information in the AEL to level processing units in the ascending order of X-coordinates is executed; this is referred to as edge tracking. Finally, upon completion of rendering of edges, the edges are deleted through edge deletion processing.

The level processing is roughly categorized into three types of processing: level addition, level deletion, and level sorting. Level addition is processing to determine whether edge information transmitted through edge processing is targeted for rendering on the basis of edge orientations and clip information contained in the edge information, and add the edge information to a link list called an active level list (ALL) if it is targeted for rendering. Contrary to level addition processing, level deletion processing is processing to delete edges that served as rendering targets up until that point from the ALL on the basis of edge orientations and clip information when the edges are no longer rendering targets. The ALL is sorted in the ascending order of level numbers, and ALL sort processing called level sorting is executed when a level is added or deleted. Once the foregoing processing has been executed, level information is passed to fill processing on a span-by-span basis.

Fill processing is roughly categorized into three types of processing: image scaling, image rotation, and pixel generation. A bitmap image contained in vector data can not only include information of its edges, but also designate scaling, rotation, and the like. Image scaling is processing to, when a bitmap image contained in the display list designates an enlargement factor, perform filling in accordance with the designation. Image rotation is processing to, when a bitmap image contained in the display list designates rotation information, perform filling in accordance with the designation. Pixel generation is processing to, when the display list designates a certain color value, another certain color value, and change information, perform filling in accordance with the designation.

Finally, in composite processing, image data (bitmap data) is generated by executing overlay processing designated by the display list on the basis of the high/low relationship among levels, which has been decided on in level processing, and pixels generated through fill processing, and the image data is output.

Scanlines (main scanlines) are regarded as a target line one-by-one, starting from the top scanline, and the foregoing rendering processing is executed with respect to each target scanline. If a target line has completed processing through to composite processing, it means that rendering processing for the target line has been completed. Each rendering unit holds its target line in the rendering position holding unit 301 or 302, and updates a value thereof each time it proceeds to the next target line. As such, image data is generated on a line-by-line basis.

<PDL Print Processing>

Figure 7:
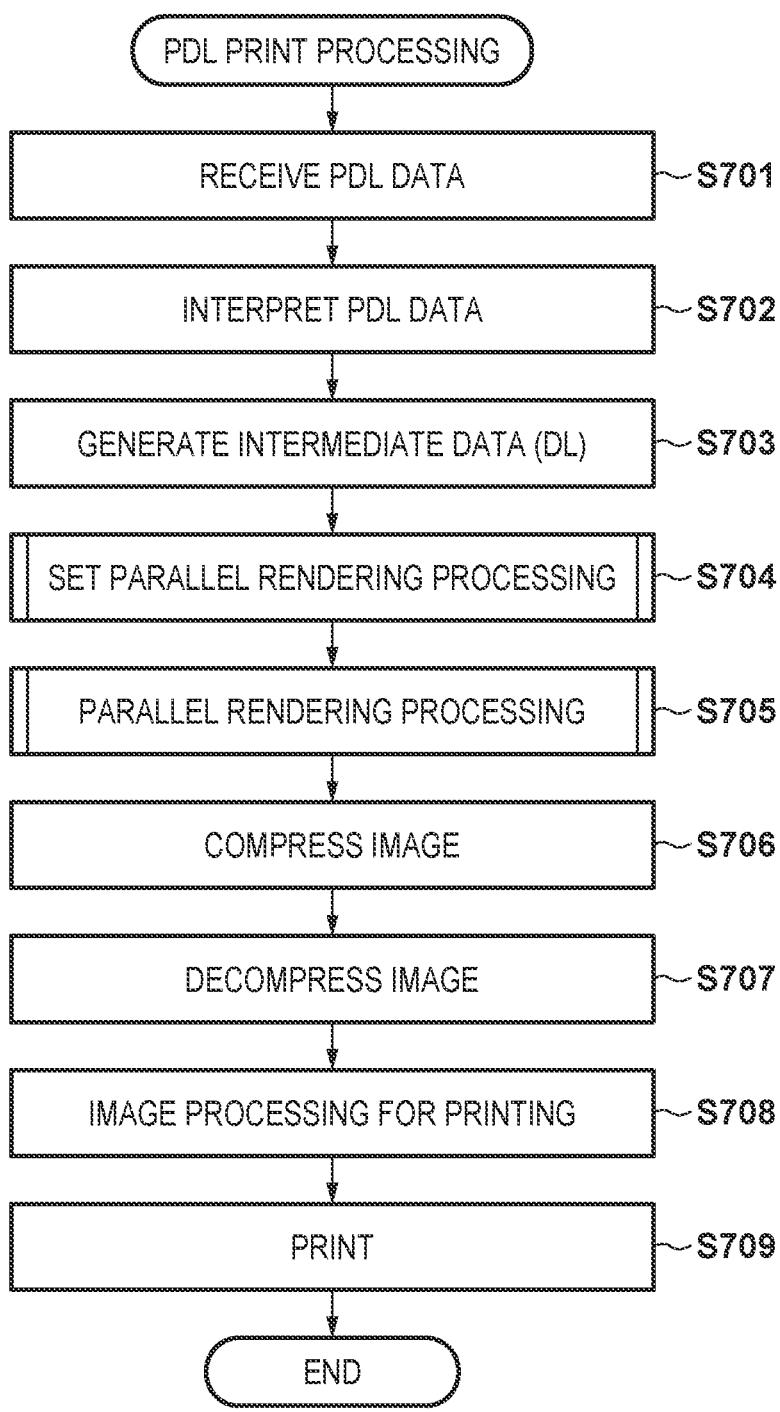
FIG. 7 is a flowchart showing PDL print processing.

FIG. 7 is a flowchart executed by the controller 101, illustrating PDL print processing. First, the CPU 108 receives PDL data transmitted from a host computer via the communication unit I/F 107, and stores the PDL data as page-based PDL data to the RAM 109 or the HDD 111 (step S701). Next, the CPU 108 interprets the received PDL data (step S702), and generates intermediate data (DL) on the basis of interpreted information (step S703). Next, the CPU 108 sets parallel rendering processing to be executed by the rendering processing unit 114 (step S704). Step S704 will be described individually with reference to a flowchart of FIG. 8. Next, the CPU 108 controls the rendering processing unit 114 to execute rendering processing using the plurality of rendering units composing the rendering processing unit 114 (step S705). Step S705 will be described individually with reference to a flowchart of FIGS. 9A and 9B. Next, the CPU 108 controls the compression processing unit 116 to execute compression processing, and then stores compressed image data to the RAM 109 (step S706). Next, the CPU 108 controls the decompression processing unit 117 to apply decompression processing to the compressed image data stored in the RAM 109, and then stores the resultant image data to the RAM 109 again (step S707). Next, the CPU 108 controls the print unit I/F 118 to transfer the image data from the RAM 109 to the print unit 105, applies image processing for correction appropriate for the device properties of the print unit 105 to the image data, and then transfers the image data to which the image processing has been applied to the print unit 105 (step S708). Thereafter, the print unit 105 prints the image data transferred from the print unit I/F 118 on a recording medium, and outputs the recording medium (step S709).

<Initial Setting of Parallel Rendering Processing>

Figure 8:
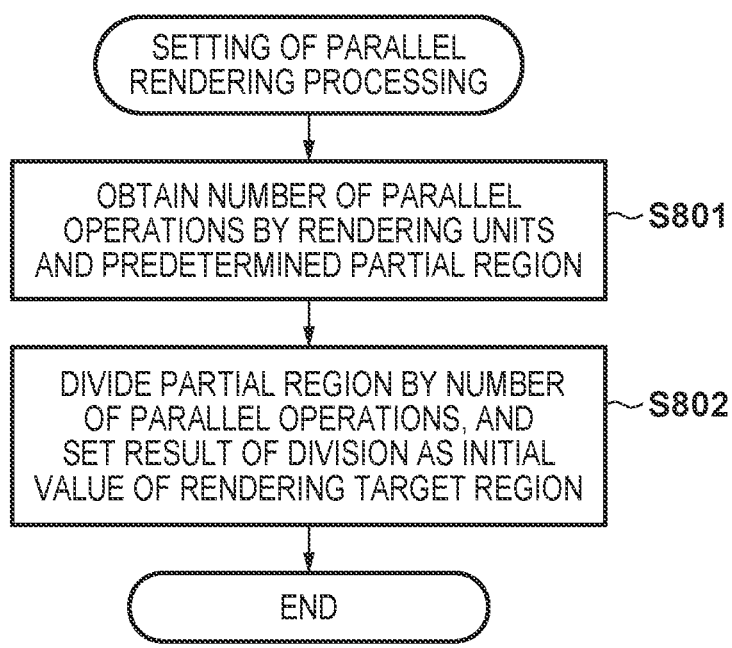
FIG. 8 is a flowchart for setting parallel rendering processing.

FIG. 8 is a flowchart illustrating the initial setting of parallel rendering processing. First, the CPU 108 obtains the number of parallel operations performed by the rendering processing unit 114 in parallel processing, as well as a predetermined partial region as an image data unit handled in post-processing following the image processing unit 114 (step S801). For example, when the rendering processing unit 114 is configured as shown in FIG. 3, the first rendering unit 401 and the second rendering unit 402 operate in parallel, and thus the number of parallel operations is two. The partial region to be processed by the rendering processing unit 114 has an image data size that is determined in correspondence with image data to be handled in post-processing by the compression processing unit 116 following the image processing unit 114; for example, the partial region corresponds to a plurality of block units each composed of 32×32 pixels and having a shape of a square tile. It will be assumed that a storage area for the image data size corresponding to the partial region has a capacity that enables reading and writing without stopping the processing by the rendering processing unit 114 and the processing by the compression processing unit 116, as with two buffers composing the block RAM 115. In the aforementioned example, the predetermined partial region is a region having a height of a block and a main scan width of a page unit, e.g., a region composed of 32 lines. Therefore, if a block size is determined by the specifications of the subsequent processing unit, e.g., the compression processing unit 116, then the size of the partial region can be determined by a size of a page to be processed.

Next, the CPU 108 sets a height of bands serving as rendering target regions by equally dividing the height of the block obtained in step S801 by the number of parallel operations obtained in step S801 (step S802). For example, provided that a block unit includes 32×32 pixels, as the number of parallel operations is two, the height of the bands is set to 32/2=16, which is set in the internal register of the rendering processing unit 114. Therefore, in the aforementioned example, the first rendering unit 401 composing the rendering processing unit 114 uses 16 lines from the $1^{st}$ line to the $16^{th}$ line as one band, and uses this band as an initial value of a rendering target region. On the other hand, the second rendering unit 402 composing the rendering processing unit 114 uses the lines following the band handled by the first rendering unit 401, that is to say, 16 lines from the $17^{th}$ line to the $32^{nd}$ line, as one band, and uses this band as an initial value of a rendering target region. As such, an initial value indicates a band serving as a rendering target region of each rendering unit, and a line number of the top line in the band and the number of lines in the band are set as the initial value for each rendering unit, for example. The first rendering unit and the second rendering unit may execute rendering processing in parallel with respect to bands belonging to different partial regions. Therefore, it is preferable that the rendering target regions also be set for each of the partial regions being processed in parallel. For example, in the present embodiment, the rendering processing unit 114 outputs and stores a rendered partial region alternately to two buffers, that is to say, a first buffer and a second buffer. Therefore, up to two partial regions may be processed in parallel. In view of this, it is preferable that the rendering target regions be set in association with the first buffer and the second buffer. As stated earlier, it is preferable that the rendering position holding units of the rendering units also be associated with the partial regions. Even with the foregoing configuration in which the rendering target regions and the rendering positions are held in association with the buffers, the following description may simply state that their values are merely held or set.

<Parallel Rendering Processing>

Figure 9A:
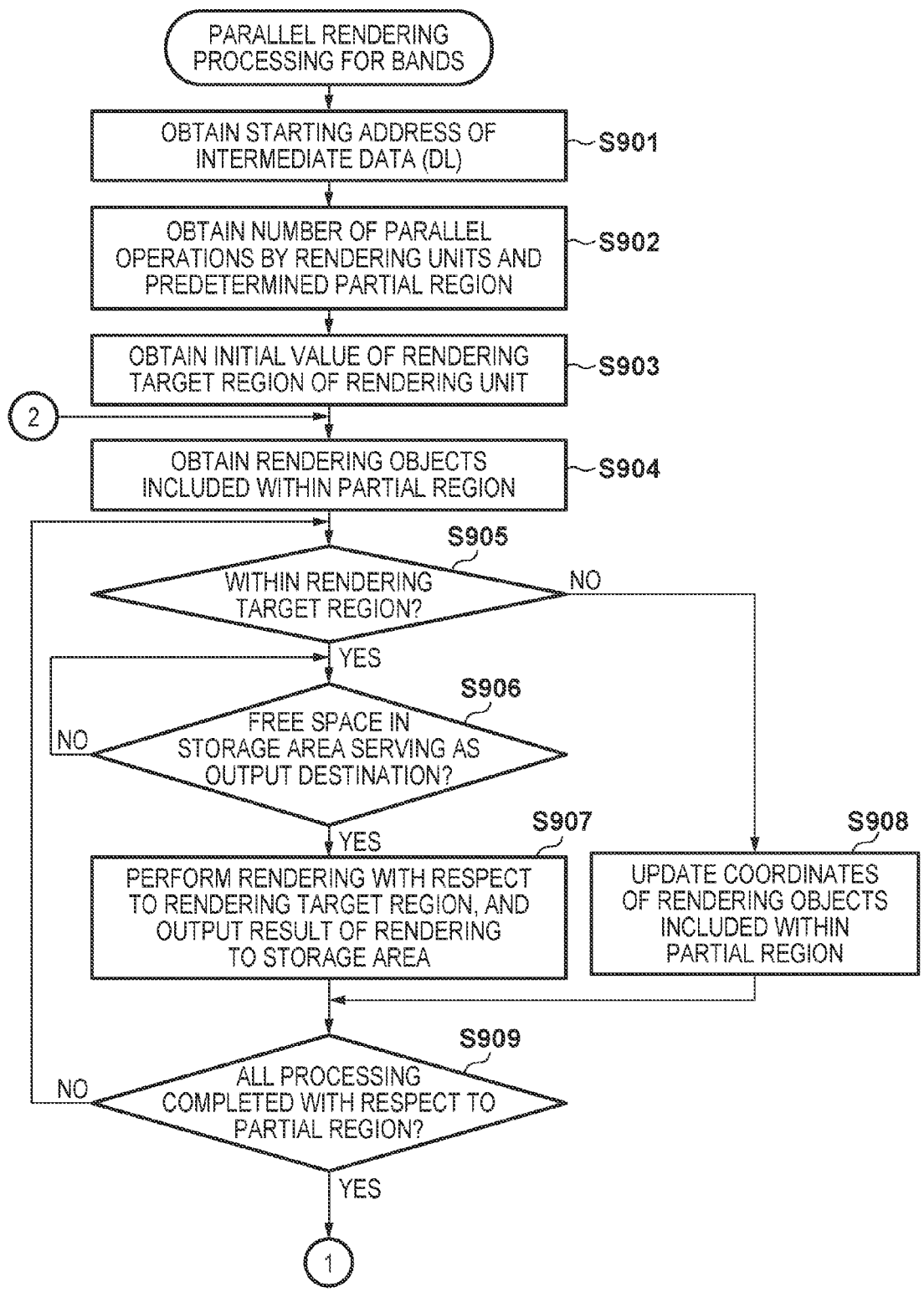
FIGS. 9A and 9B show a flowchart of parallel rendering processing.
Figure 9B:
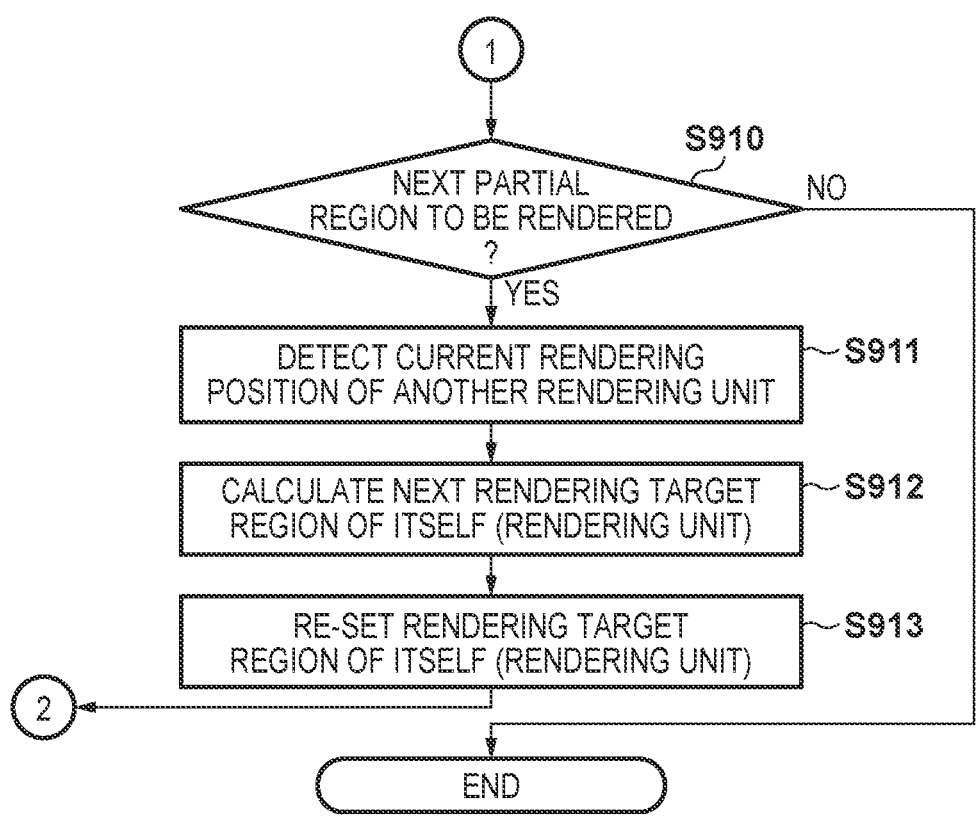

FIGS. 9A and 9B show a flowchart illustrating parallel rendering processing. In the following description, it will be assumed that the rendering processing unit 114 operates under control by the CPU 108. First, a readout processing unit of each of the rendering units that operate in parallel in the rendering processing unit 114 obtains a starting address of intermediate data (DL) set by the CPU 108 in the internal register of the rendering processing unit 114 (step S901). Next, the rendering processing unit 114 obtains the number of parallel operations and a predetermined partial region set by the CPU 108 in step S801 (step S902). Specifically, in the aforementioned example, the number of parallel operations is two, and bands in the partial region have a height corresponding to 32 lines. Next, each rendering unit of the rendering processing unit 114 obtains an initial value of a rendering target region set by the CPU 108 in step S802 (step S903). Specifically, in the aforementioned example, an initial value of a rendering target region handled by the first rendering unit 401 indicates 16 lines from the $1^{st}$ line to the $16^{th}$ line, whereas an initial value of a rendering target region handled by the second rendering unit 402 indicates 16 lines from the $17^{th}$ line to the $32^{nd}$ line. Next, each rendering unit of the rendering processing unit 114 refers to rendering objects included within a partial region to be rendered from the starting address of the intermediate data (DL) obtained in step S901, and obtains all of such rendering objects (step S904). Next, each rendering unit of the rendering processing unit 114 determines whether the obtained rendering objects are included within the rendering target region handled by itself (step S905); the processing proceeds to step S906 if they are included within the rendering target region (YES), and to step S907 if they are not included within the rendering target region (NO).

Next, in step S906, each rendering unit of the rendering processing unit 114 determines whether the block RAM 115 serving as an output destination has a free space; if there is no free space (NO), it waits until there is a free space in step S906, and if there is a free space (YES), the processing proceeds to step S907. In the present embodiment, the following two areas are prepared in the block RAM 115: the first buffer and the second buffer. Next, in step S907, each rendering unit of the rendering processing unit 114 generates corresponding image data by rendering the rendering objects obtained in step S904, and outputs the image data obtained as a result of the rendering processing to the free space in the block RAM 115 detected in step S906 (step S907). As stated earlier, the rendering processing progresses and the output is performed on a per-scanline basis. In accordance with the output, the positional coordinate of a target scanline being generated, which is held in the rendering position holding unit in correspondence with the rendering unit that is performing the rendering and the buffer being used as an output destination, is also updated. On the other hand, if the processing proceeds to step S908, each rendering unit of the rendering processing unit 114 executes processing in which only the positional coordinates of the rendering objects included within the corresponding rendering target region are updated on a per-scanline basis, and reading of the intermediate data (DL) is skipped without executing rendering processing with respect to that rendering target region.

In step S909, each rendering unit of the rendering processing unit 114 determines whether there is a next scanline to be processed within the partial region; if there is a next scanline (YES), the processing proceeds to step S905 and rendering processing is repeated again, and if there is no next scanline (NO), the processing proceeds to step S910. In step S909, it can be determined that there is no next scanline if, for example, a value obtained by adding the number of lines targeted for processing to an address of the top scanline targeted for processing is larger than an address of the last scanline that has already been processed. In step S910, each rendering unit of the rendering processing unit 114 determines whether the intermediate data (DL) stored in the RAM 109 contains a next partial region to be rendered; if there is a next partial region (YES), the processing proceeds to step S911 to repeat rendering processing, and if there is no next partial region (NO), rendering processing is ended.

In step S911, upon completion of rendering processing with respect to a band targeted for processing (hereinafter also referred to as a target band), each rendering unit of the rendering processing unit 114 detects a current rendering position of another rendering unit. For example, in step S911, the first rendering unit 401 refers to the rendering position holding unit 302 of the second rendering unit 402 using the rendering position detection unit 303, and detects a rendering position of the second rendering unit 402 in a current partial region. In the following description, it will be assumed that the rendering position is the $8^{th}$ line of the 16 lines handled by the second rendering unit 402. Note that the target of detection is another rendering unit that is outputting data to the same buffer as the rendering unit that is executing step S911 (also referred to as a target rendering unit). In other words, a current rendering position of another rendering unit that is processing the same partial region as the target rendering unit is detected.

Next, in step S912, each rendering unit of the rendering processing unit 114 calculates a fraction representing the next rendering target region to be processed by itself. For example, in step S912, the first rendering unit 401 obtains the rendering position detected in step S911 using the rendering region control unit 305, and calculates a fraction of the next predetermined partial region composed of 32 lines on the basis of the rendering position. In an exemplary calculation method, as the number of remaining lines to be processed by the second rendering unit 402 is 8 in view of the aforementioned rendering position, i.e., the $8^{th}$ line of the 16 lines, the next 32 lines and the remaining number of lines to be processed, i.e., 16−8=8, are added, the result of the addition is equally divided again, and the result of the division is to be handled. Specifically, in the next partial region composed of 32 lines, the first rendering unit 401 handles (8+32)/2=20 lines as the rendering target region. To paraphrase it in a general manner, the next rendering target region of the target rendering unit is obtained by the following expression: (the number of remaining lines to be processed+the number of lines in a partial region)/2. The "number of remaining lines to be processed" is (the number of lines in the rendering target region of another rendering unit−the rendering position of another rendering unit), and the size of the rendering target region of another rendering unit is (the number of lines in a partial region−the number of lines in the rendering target region of the target rendering unit); therefore, the next rendering target region of the target rendering unit is obtained by the following expression: (the number of lines in the partial region−the number of lines in the rendering target region of the target rendering unit−the rendering position of another rendering unit+the number of lines in the partial region)/2. Accordingly, the next rendering target region of another rendering unit is obtained by the following expression: the number of lines in the partial region−the next rendering target region of the target rendering unit. Using the numerical values described in the aforementioned example, in the next partial region composed of 32 lines, 32−20=12 lines serve as the next rendering target region of the second rendering unit 402. In step S913, each rendering unit of the rendering processing unit 114 re-sets the rendering target region calculated in step S912 using the rendering region control unit 305, notifies the readout processing unit and a write processing unit of the re-set rendering target region, and then proceeds to step S904 to continue rendering processing with respect to the subsequent partial region. In step S913, for example, the first rendering unit sets the calculated value, i.e., 20 lines, as the next rendering target region of the target rendering unit. For the second rendering unit that will later complete rendering processing with respect to a part of the same partial region, a value for obtaining 12 lines—the next rendering target region of the second rendering unit—is also set in the rendering position holding unit 301 of the first rendering unit. In the above-described manner, the second rendering unit also obtains the next rendering target region of the target rendering unit using the expression (the number of lines in the partial region−the number of lines in the rendering target region of the target rendering unit−the rendering position of another rendering unit+the number of lines in the partial region)/2; thus, the "rendering position of another rendering unit", i.e., the rendering position of the first rendering unit is set so that the following relationship holds: (the number of lines in the partial region−the number of lines in the rendering target region of the target rendering unit−the rendering position of another rendering unit+the number of lines in the partial region)/2=(the number of lines in the partial region−the next rendering target region of the target rendering unit). Using the numerical values described in the aforementioned example, in order to satisfy the relationship (32−16−the rendering position of another rendering unit+ 32)/2=32−20, the following is set as the rendering position of the first rendering unit: −64+40+32−16+32=24.

The first rendering unit to complete processing with respect to a rendering target region obtained by dividing a certain partial region may set the next rendering target region of another rendering unit in another rendering unit. In this case, the target rendering unit needs to notify another rendering unit of information indicating that the next rendering target region has already been set, and another rendering unit that has received the notification need not set the next rendering target region of itself.

On the other hand, in step S911, the second rendering unit 402 refers to the rendering position holding unit 301 of the first rendering unit 401 using the rendering position detection unit 302, and detects a rendering position of the first rendering unit in a current partial region. In the following description, it will be assumed that the rendering position of the first rendering unit 401 is the 16$^{th}$ line of the 16 lines handled thereby, that is to say, rendering of the 16 lines handled by the first rendering unit 401 is completed before rendering of the 16 lines handled by the second rendering unit 402 is completed. Next, in step S912, the second rendering unit 402 obtains the rendering position detected in step S911 (using the numerical value described above, 24) using the rendering region control unit 305, and calculates a fraction of the next predetermined partial region composed of 32 lines on the basis of the rendering position. In an exemplary calculation method, in the next partial region composed of 32 lines, (32−16−24+32)/2=12 lines serve as the next rendering target region of the second rendering unit 402, as described above. Through the foregoing steps S911 to S913, the rendering target region handled by the first rendering unit 401 is changed from 16 lines (initial value) to 20 lines, and the rendering target region handled by the second rendering unit 402 is changed from 16 lines (initial value) to 12 lines. In the case of a configuration in which the first rendering unit has already set the next rendering target region of the second rendering unit, the second rendering unit need not set the next rendering target region of itself.

In the process of step S912, an amount of image data that has not been generated yet by another rendering unit at the time when the target rendering unit has completed the generation of image data of the rendering target region is equally allotted to the plurality of rendering units, and the next rendering target region of each rendering unit is obtained by adding the allotted amount to an amount of image data that has already been generated at that time.

Repeating the foregoing procedure can change the ratio at which the plurality of rendering units share the execution of rendering processing with respect to a certain partial region composed of 32 lines. In the aforementioned example, when the first rendering unit 401 completes rendering before the second rendering unit 402 does, it performs control to increase a fraction representing the next rendering target region of itself; the same goes for the reverse case. Therefore, repeating the foregoing control can reduce the difference between processing time periods of the plurality of rendering units in rendering a predetermined partial region, and shorten a total processing time period until the completion of rendering processing. This will be described individually with reference to FIGS. 13A and 13B.

FIGS. 13A and 13B are timing charts illustrating parallel rendering processing. FIG. 13A, which corresponds to FIG. 12A, is a conceptual diagram for a case in which, when rendering a partial region having a block height (e.g., a pair of bands 11 and 12, and a pair of bands 21 and 22), rendering target regions handled by the plurality of rendering units are fixed as regions obtained by, for example, equally dividing the partial region into two, without controlling the ratio of the rendering target regions. FIG. 13B, which corresponds to FIG. 12B, is a conceptual diagram for a case in which, when rendering a partial region having a block height (e.g., a pair of bands 11 and 12, and a pair of bands 21 and 22), the ratio of rendering target regions handled by the plurality of rendering units is controlled to change in each partial region. In FIG. 13A, the first rendering unit outputs the band 11 to the first buffer from time T0 to time T1, outputs the band 21 to the second buffer from time T1 to time T2, outputs the band 31 to the first buffer from time T2 to time T4 during which the first buffer has a free space, and outputs the band 41 to the second buffer from time T4 to T6 during which the second buffer has a free space. The second rendering unit outputs the band 12 to the first buffer from time T0 to time T1, outputs the band 22 to the second buffer from time T1 to time T3, outputs the band 32 to the first buffer from time T3 to time T7, and outputs the band 42 to the second buffer from time T7 to time T12. The compression processing unit 116 obtains the blocks 11 to 14 from the first buffer from time T1 to time T2, and obtains the blocks 21 to 24 from the second buffer from time T3 to time T4. The compression processing unit 116 also obtains the blocks 31 to 34 from the first buffer from time T7 to time T9, and obtains the blocks 41 to 44 from the second buffer from time T12 to time T13. In time periods with line shading in FIG. 13A, that is to say, from time T2 to time T3, from time T4 to time T7, and from time T9 to time T12, the compression processing unit 116 waits for output from the second rendering unit that takes more time in output than the first rendering unit. On the other hand, in FIG. 13B, the first rendering unit outputs the band 11 to the first buffer from time T0 to time T1, outputs the band 21 to the second buffer from time T1 to time T2, outputs the band 31 to the first buffer from time T2 to time T6, and outputs the band 41 to the second buffer from time T6 to time T9. The second rendering unit outputs the band 12 to the first buffer from time T0 to time T1, outputs the band 22 to the second buffer from time T1 to time T3, outputs the band 32 to the first buffer from time T3 to time T5, and outputs the band 42 to the second buffer from time T5 to time T10. The compression processing unit 116 obtains the blocks 11 to 14 from the first buffer and compresses them from time T1 to time T2, and obtains the blocks 21 to 24 from the second buffer and compresses them from time T3 to time T4. The compression processing unit 116 also obtains the blocks 31 to 34 from the first buffer and compresses them from time T6 to time T8, and obtains the blocks 41 to 44 from the second buffer and compresses them from time T10 to time T11. In time periods with line shading in FIG. 13B, that is to say, from time T2 to time T3, from time T4 to time T6, and from time T8 to time T10, the compression processing unit 116 waits for output from one of the first and second rendering units that takes more time in output than the other. Comparison between FIG. 13A and FIG. 13B shows that, by controlling the ratio of rendering target regions handled by the plurality of rendering units when rendering a partial region having a block height, a wait time period faced by each rendering unit can be shortened, and the efficiency of parallel processing can be increased.

To summarize the present embodiment, the image forming apparatus 100 includes the rendering processing unit 114 provided with the plurality of rendering units that are capable of operating in parallel, and the plurality of rendering units share generation of image data of a partial region having a predetermined height (e.g., a block height) in such a manner that each rendering unit generates image data of a different one of rendering target regions (bands) obtained by dividing the partial region. An amount of image data that has not been generated yet within the partial region at the time when generation of image data of one of the rendering target regions obtained by dividing the partial region is completed first is allotted to the plurality of rendering units, and an amount of image data obtained by adding the allotted amount to an amount of image data that has already been generated by each rendering unit at that time is set in the rendering unit as a rendering target region in the next partial region. Consequently, processing time periods of the rendering units are equalized.

As described above, as the present embodiment performs dynamic control to reduce the difference between processing time periods of the plurality of rendering units on the basis of rendering positions actually measured during rendering processing, a wait time period faced by each rendering unit can be shortened, and the efficiency of parallel processing can be increased.

Although two buffers are used in the foregoing embodiment, the present embodiment is applicable to a case in which one buffer is used. In this case, it is sufficient to provide one rendering position holding unit and one rendering target region for each rendering unit.

(First Modification Example)

As opposed to the first embodiment in which image data generated by the rendering processing unit 114 is temporarily held in the block RAM 115 serving as a local memory different from the RAM 109, the present modification example deals with an exemplary configuration in which image data generated by the rendering processing unit 114 is stored directly to the RAM 109.

Figure 4:
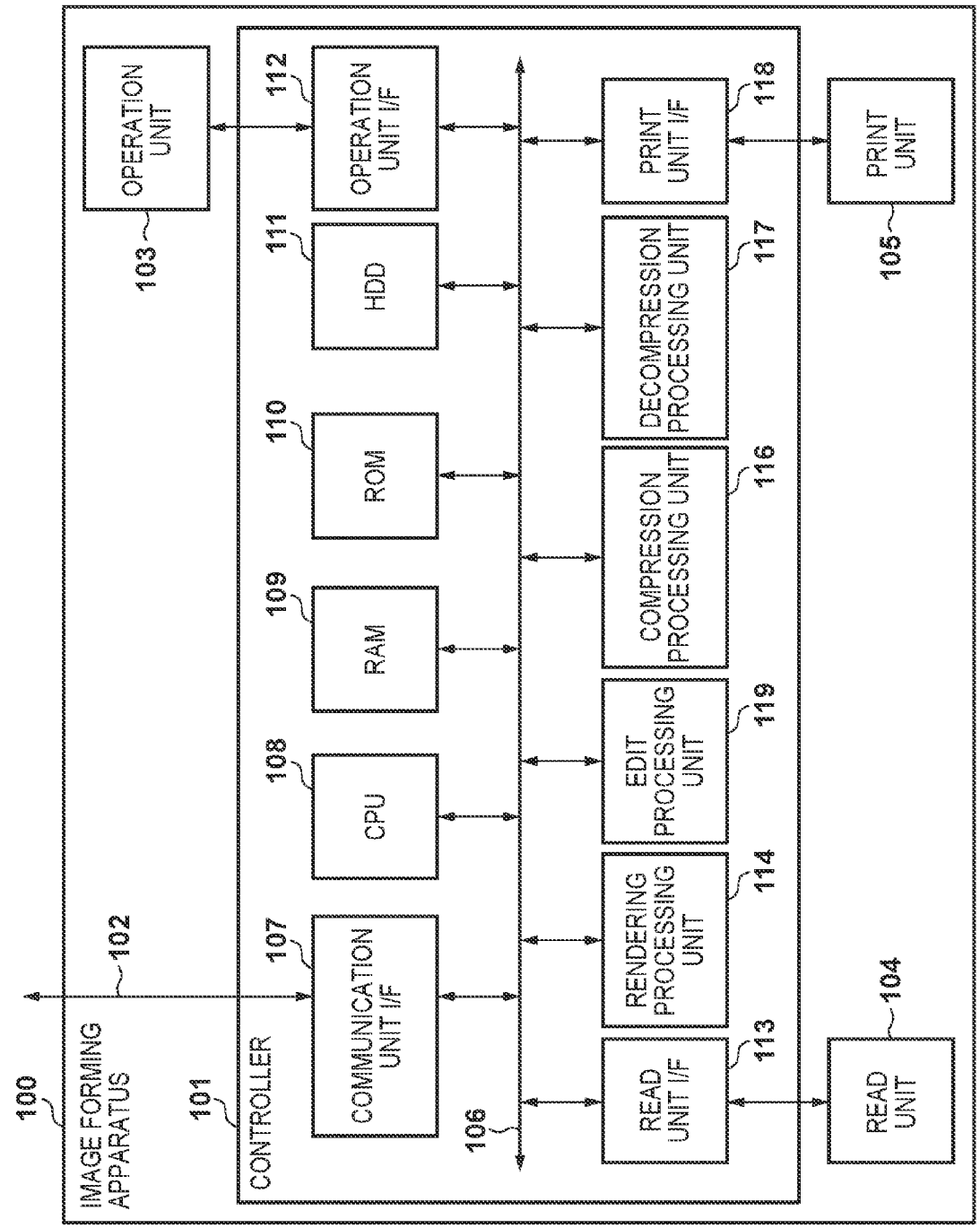
FIG. 4 shows a configuration of an image forming apparatus according to a second embodiment.

FIG. 4 shows an exemplary configuration of the image forming apparatus 100 according to the present modification example. As FIG. 4 depicts a modification example of the configuration described with reference to FIG. 1, a description of portions that are shared in common with FIG. 1 is omitted, and only the differences from FIG. 1 will be described. In FIG. 4, the rendering processing unit (RIP) 114 has a bus connection structure for performing data input/output with respect to the system bus 106. An edit processing unit 119 that applies editing, such as image rotation, to image data may also be connected in a similar manner. In addition, the compression processing unit 116 and the decompression processing unit 117 are connected similarly to FIG. 1.

Figure 5:
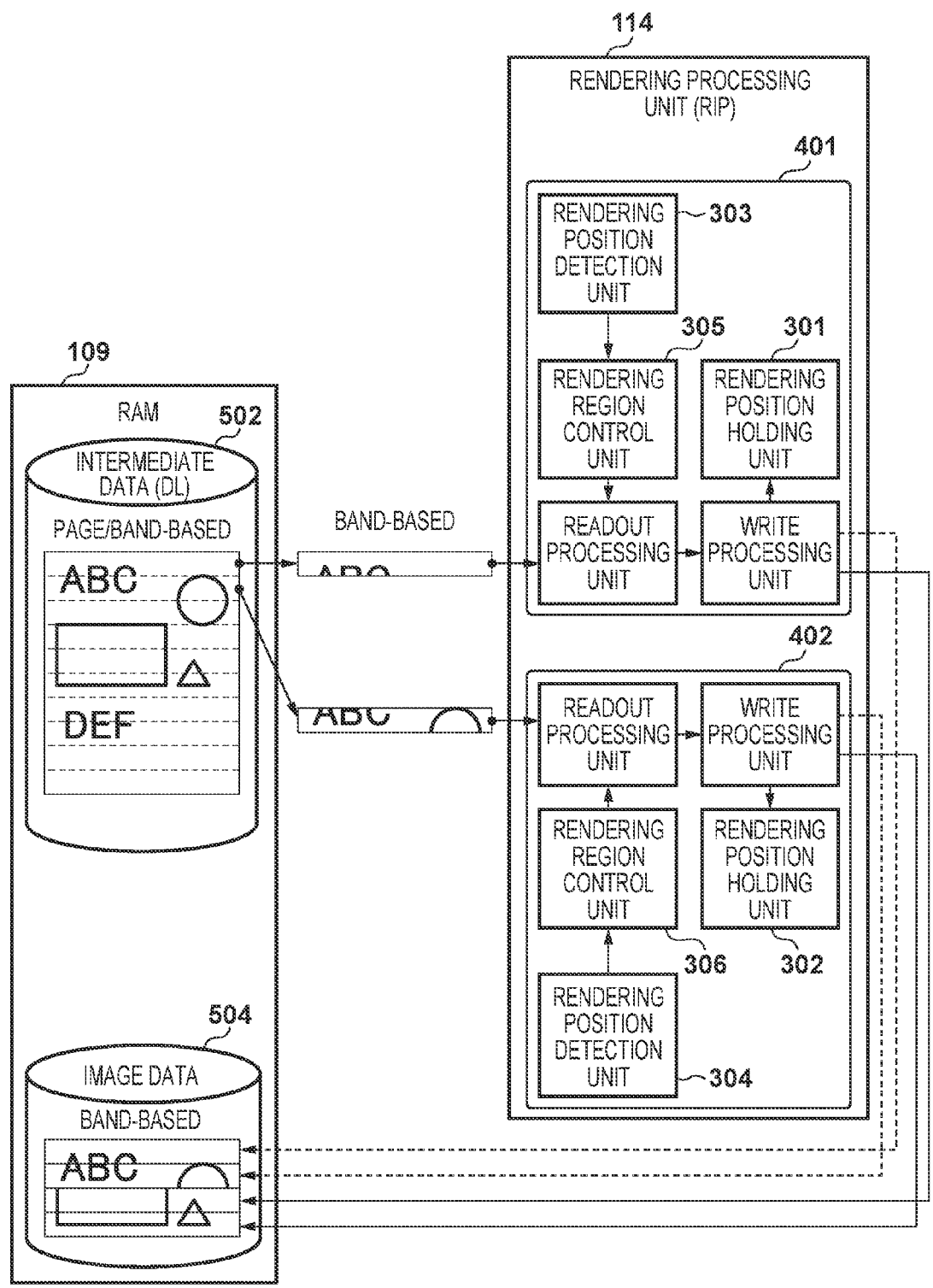
FIG. 5 shows a block configuration related to rendering processing according to the second embodiment.

A description is now given of the operations of rendering processing in PDL printing in the present embodiment with reference to FIG. 5. FIG. 5 shows the internal operations in which band-based rendering processing is executed in parallel with respect to intermediate data temporarily held in the RAM 109, and then image data is stored to the RAM 109 again. In FIG. 5, the image forming apparatus 100 renders a plurality of bands within a single page in parallel using the first rendering unit 401 and the second rendering unit 402 that compose the rendering processing unit 114. The first rendering unit 401 executes rendering processing with respect to odd-numbered bands within the single page, skips reading of even-numbered bands, and only updates positional coordinates of rendering objects on a per-scanline basis. The second rendering unit 402 executes rendering processing with respect to even-numbered bands within the single page, skips reading of odd-numbered bands, and only updates positional coordinates of rendering objects on a per-scanline basis. As such, each of the first rendering unit 401 and the second rendering unit 402 obtains rendering objects targeted for rendering processing on a band-by-band basis, and thus the intermediate data (DL) 202 primarily stored in the RAM 109 may be page-based or band-based. Next, the first rendering unit 401 sequentially outputs band-based image data to the RAM 109. The second rendering unit 402 also sequentially outputs band-based image data to the RAM 109. Other processing units within the controller 101, such as the edit processing unit 119, the print unit I/F, and the communication unit I/F, apply subsequent image processing to image data stored by the rendering processing unit 114 to the RAM 109 in accordance with functions to be realized. The RAM 109 is composed of two buffers that allow writing and readout of image data to be performed simultaneously. Therefore, for example, writing processing by the first rendering unit 401 and the second rendering unit 402, and readout processing for subsequent image processing by other processing units within the controller 101, can be executed simultaneously.

As described above, as the second embodiment of the present invention performs control to reduce the difference between processing time periods of the plurality of rendering units on the basis of rendering positions actually measured during rendering processing, a wait time period faced by each rendering unit can be shortened, and the efficiency of parallel processing can be increased.

(Second Modification Example)

As opposed to the first embodiment in which a ratio of rendering target regions is changed on the basis of rendering positions actually measured within the rendering processing unit 114, the present modification example deals with an exemplary configuration based on a combination with a predicted load value that is predicted on a per-scanline basis.

Figure 6:
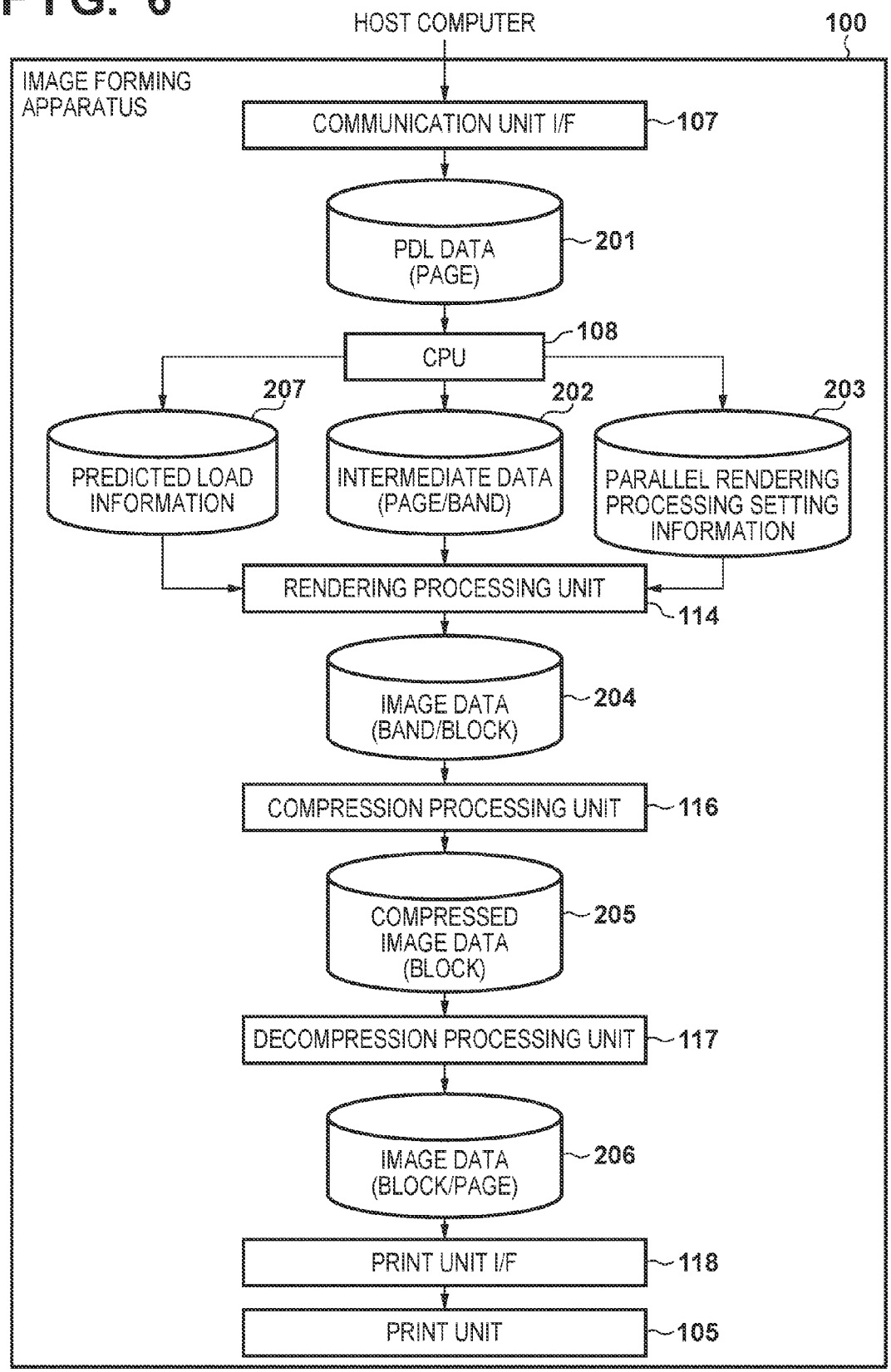
FIG. 6 shows a data flow in PDL print processing of an image forming apparatus according to a third embodiment.

FIG. 6 shows a data flow in PDL print processing in the image forming apparatus 100. As FIG. 6 depicts a modification example of FIG. 2, a description of portions that are shared in common with FIG. 2 is omitted, and only the differences from FIG. 2 will be described. In FIG. 6, the CPU 108 generates page- or band-based intermediate data (DL) 202 by interpreting the received PDL data 201, calculates a predicted load value on a per-scanline basis, and stores the result of calculation as predicted load information to the RAM 109. For example, the number of edges per raster line can be used as the predicted load information. The rendering processing unit 114 refers to rendering data contained in the intermediate data (DL) 202, generates image data 204 through parallel execution of rendering processing with respect to a plurality of band-based rectangular regions within a single page, and stores it to the RAM 109. Here, the rendering processing unit 114 changes a ratio of rendering target regions of the plurality of rendering units on the basis of rendering positions actually measured and predicted load values of a current rendering target region and the next partial region.

Figure 10:
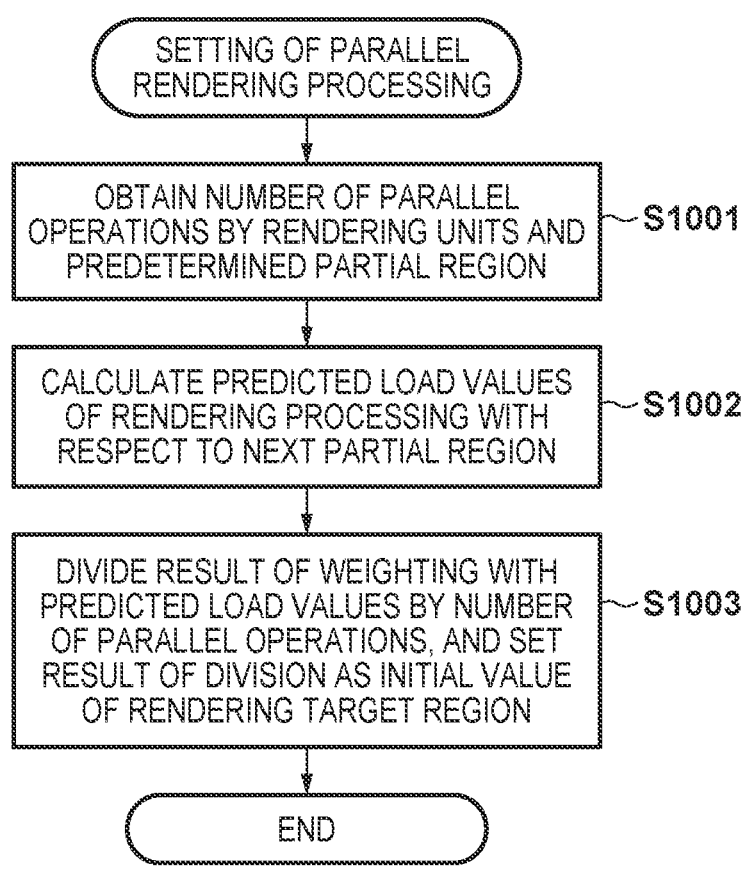
FIG. 10 is a flowchart for setting parallel rendering processing that involves prediction processing.

FIG. 10 is a flowchart of processing executed by the CPU 108 to set parallel rendering processing that involves prediction processing. As FIG. 10 depicts a modification example of FIG. 8, a description of portions that are shared in common with FIG. 8 is omitted, and only the differences from FIG. 8 will be described. Step S1001 of FIG. 10 is exactly the same as step S801 of FIG. 8. In step S1002, the CPU 108 calculates a predicted load value on a per-scanline basis within a partial region. In an exemplary calculation method, provided that a predetermined partial region has 8 lines having a main scan width of a page unit for the sake of simplicity, the predicted load values of the lines are calculated as weighting coefficients representing relative values (e.g., 1:1:2:3:4:2:5:4). Next, in step S1003, the CPU 108 divides the result of weighting with the predicted load values by the number of parallel operations, and sets the result of division as an initial value of a rendering target region. For example, in the aforementioned example, a sum total of the weighting coefficients of the 8 lines is 1+1+2+3+4+2+5+4=22, and rendering target regions to be handled are set by equally dividing the sum total by the number of the plurality of rendering units that operate in parallel (e.g., 2). For example, using the numerical values described in the aforementioned example, dividing the sum total of the predicted load values, i.e., 22 by the number of parallel operations, i.e., 2 yields 11 (=22/2) as a load of one rendering unit. As a sum total of predicted load values from the $1^{st}$ line to the $5^{th}$ line is 1+1+2+3+4=11, these 5 lines are set as the rendering target region of the first rendering unit 401. On the other hand, the remaining three lines, for which a sum total of predicted load values is 2+5+4=11 (=22/2), are set as the rendering target region of the second rendering unit 402. It is not always the case that a sum total of predicted load values of lines to be rendered is the same for every rendering unit as in the case of the numerical values described in the foregoing example. When the result of division does not yield the same sum total of predicted load values, division is performed so that the sum totals of predicted load values are as equal as possible.

Figure 11A:
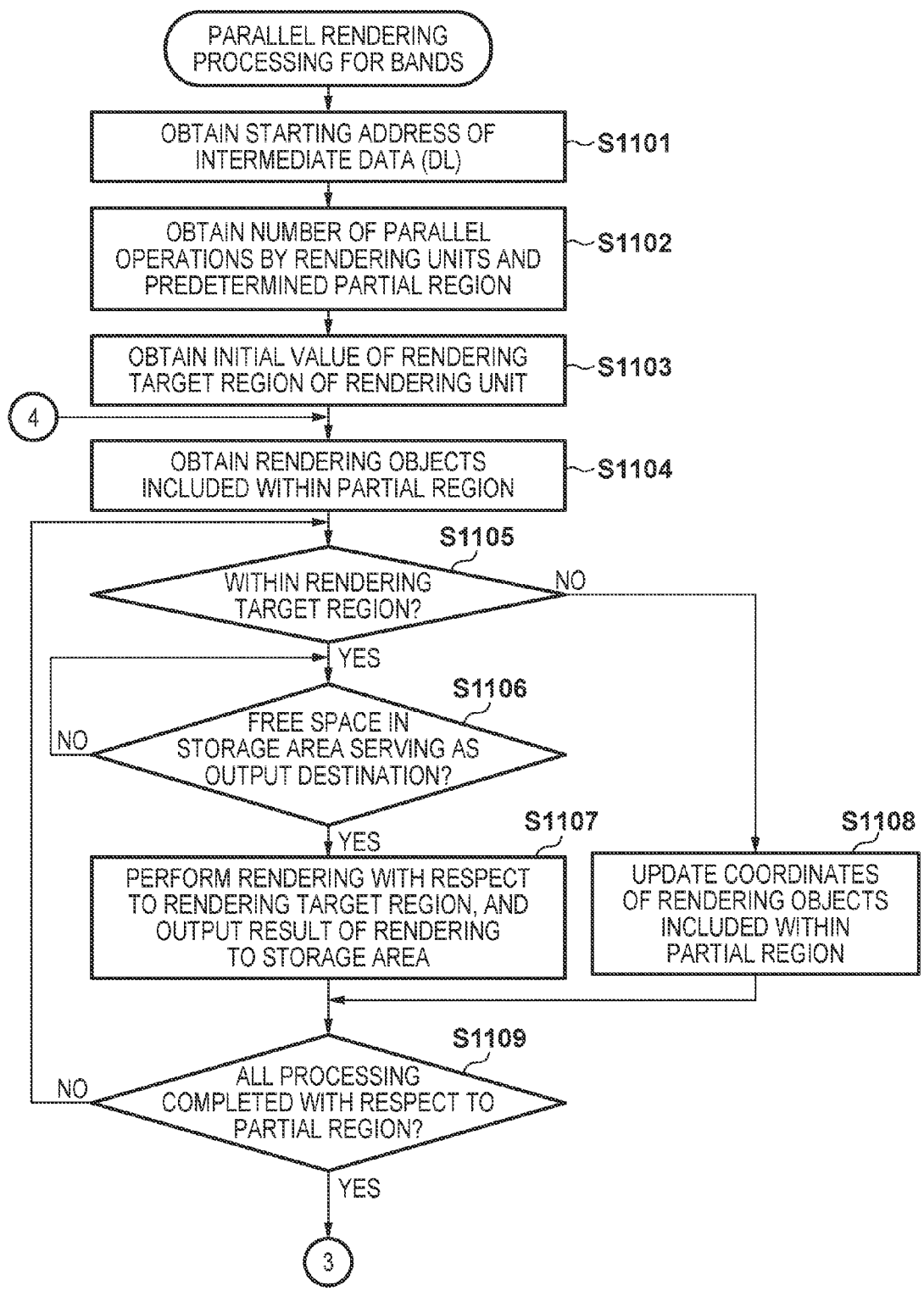
FIGS. 11A and 11B show a flowchart of parallel rendering processing using the result of prediction.
Figure 11B:
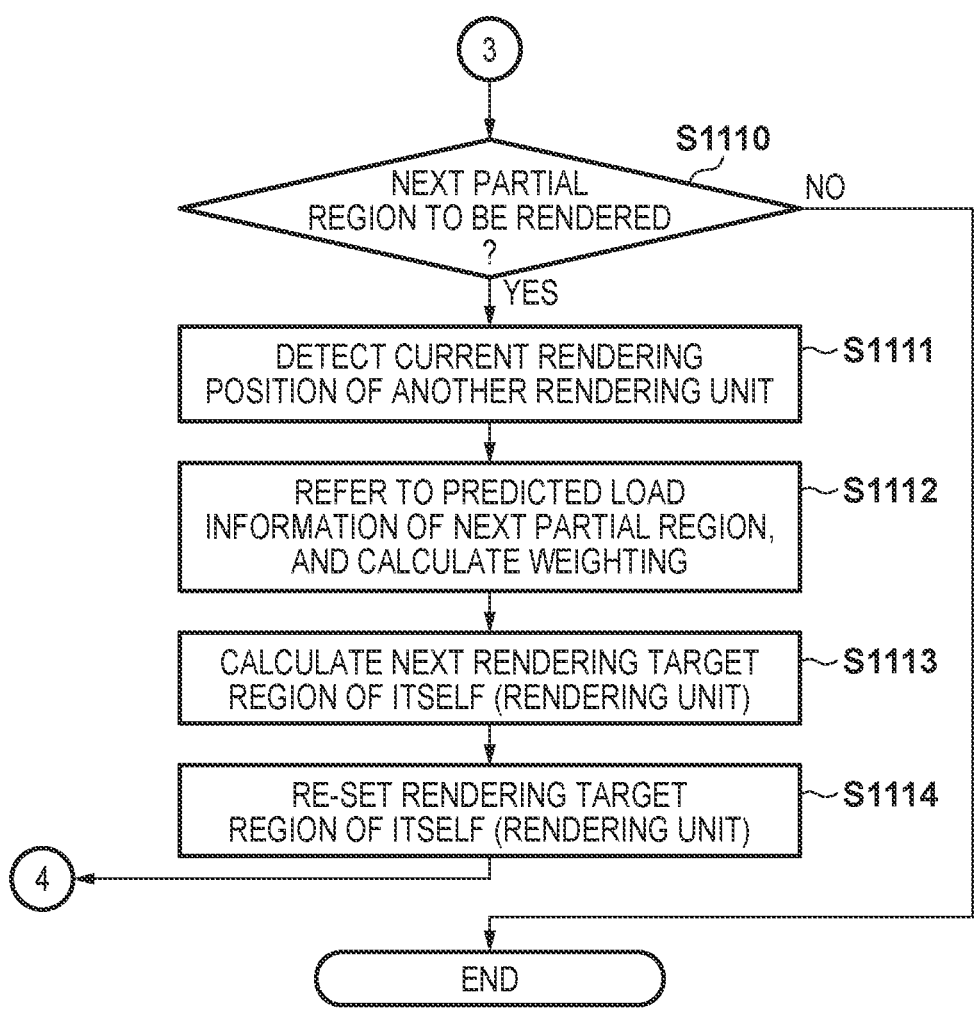

FIGS. 11A and 11B show a flowchart illustrating parallel rendering processing using the result of prediction. As FIGS. 11A and 11B depict a modification example of FIGS. 9A and 9B, a description of portions that are shared in common with FIGS. 9A and 9B is omitted, and only the differences from FIGS. 9A and 9B will be described. Steps S1101 to S1111 of FIGS. 11A and 11B are exactly the same as steps S901 to S911 of FIGS. 9A and 9B. In step S1112, the number of lines remaining for another rendering unit, which was detected in step S1110, and the predicted load values of the next partial region are referred to, and weighting calculation is performed in a manner similar to the calculation method of step S1002 of FIG. 10. For example, the calculation yields 4 as a sum total of weighting coefficients of the remaining lines, and 22 as a sum total of the weighting coefficients of the next partial region in exactly the same manner as the example of FIG. 10. Next, in step S1113, setting is performed to equally divide the result of calculation in step S1112, i.e., 4+22=26, among the plurality of rendering units that operate in parallel. Specifically, for example, 6 lines corresponding to 1+1+2+3+4+2=13 (=26/2) are set as the next rendering target region of the first rendering unit 401, and the remaining 2 lines corresponding to 4+5+4=13 (=26/2) are set as the next rendering target region of the second rendering unit 402. In step S1114, each of the rendering region control units of the plurality of rendering units controls the number of lines serving as the rendering target region in accordance with the ratio calculated in step S1113. Repeating the foregoing control can reduce the difference between processing time periods of the plurality of rendering units in rendering a predetermined partial region, and shorten a total processing time period until the completion of rendering processing.

As described above, as the present modification example performs control to reduce the difference between processing time periods of the plurality of rendering units on the basis of rendering positions actually measured during rendering processing and predicted load values, a wait time period faced by each rendering unit can be shortened, and the efficiency of parallel processing can be increased.

(Third Modification Example)

In the first embodiment, a band-based partial region having a main scan width of a page unit, as well as rendering target regions composing the partial region, is allotted to the plurality of rendering units; alternatively, as shown in FIG. 12C, a page unit may be divided into band units in the main scanning direction, and rendering and output may be performed sequentially on a band-by-band basis. In this case, a buffer capacity of the block RAM 115 can be reduced.

(Fourth Modification Example)

Although the first embodiment has described an example in which the number of parallel operations is two, allotment can be changed also in a case where the number of parallel operations is three or more under a similar concept. For example, when the number of parallel operations is three, the following method may be used: the first rendering unit to complete rendering processing refers to the rendering positions of the other two rendering units and makes allotment vary between the first rendering unit and the third rendering unit, whereas allotment equivalent to equal division is maintained for the second rendering unit. Similarly, for example, when the number of parallel operations is four, the following method may be used: allotment varies between the first rendering unit and the fourth rendering unit, and between the second rendering unit and the third rendering unit.

In these cases, for example, it is sufficient to apply the aforementioned first embodiment under the assumption that the first rendering unit to complete rendering processing serves as the first rendering unit according to the aforementioned first embodiment and refers to the rendering positions of other rendering units, and a rendering unit that has the largest number of remaining lines serves as the second rendering unit. For example, it is sufficient to adopt a configuration in which a rendering target region set for each rendering unit can be accessed by other rendering units to discover the remaining numbers of lines. It goes without saying that the foregoing is merely an example, and other configurations may be adopted.

(Fifth Modification Example)

In the second modification example, when the processing load of the load prediction processing itself is large and thus has a possibility of delaying the intended start of rendering processing, control may be performed to only change allotment on the basis of rendering positions actually measured, as described in the first embodiment, without using the predicted load values.

(Sixth Modification Example)

In the first embodiment, the progress of processing by another rendering unit at the time of completion of rendering processing by one rendering unit with respect to a target band is determined by referring to the number of lines that have already been processed in the target band. Alternatively, the progress may be determined on the basis of, for example, time. For example, each rendering unit measures a time period taken to execute rendering processing by starting a timer when it starts the processing with respect to its target band and reading a value of the time when it ends the processing. Upon completion of the rendering processing by all rendering units with respect to their bands, the difference between the measured time periods is converted into the difference between the numbers of lines, and the heights of the next target bands are determined in a procedure similar to the procedure of the first embodiment or a modification example thereof. For example, assume that a target band of a rendering unit that has completed the processing with respect to the target band first has a height Hf, a processing time period thereof is Tf, a target band of a rendering unit that has completed the processing with respect to the target band later has a height Hs, a processing time thereof is Ts, and the aforementioned difference between the measured time periods is ΔT. Also assume that the rendering unit that has completed the processing with respect to the target band first is going to handle the next target band having a height Hfn=Hf(1+(ΔT/2)*(1/Tf)), for example. Also assume that the rendering unit that has completed the processing with respect to the target band later is going to handle the next target band having a height Hsn=Hs−(Hfn−Hf), for example. Here, Hf+Hs=Hfn+Hsn=a block height.

Although the foregoing is merely an example, the amount of processing by the rendering units can be distributed in the above-described manner on the basis of temporal index values instead of spatial index values of processing loads, so as to minimize the difference between timings of completion of rendering processing by the rendering units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-037295, filed Feb. 26, 2015, which is hereby incorporated by reference herein in its entirety.

What is claimed is:

1. An image forming method for generating a raster image of a page using at least first renderer and second renderer, comprising:
setting sizes of first and second areas to be rendered of a first partial area of the page;
starting generation a first raster image for the first area to be rendered by the first renderer;
starting generation a second raster image for the second area to be rendered by the second renderer;
setting sizes of third and fourth areas to be rendered of a second partial area of the page according to a size of a rest of the second area for which no raster image has been generated at a time of completion of generation of a raster image for the first area to be rendered by the first renderer, the second partial area being different than the first partial area;
starting generation a third raster image for the third area by the first renderer after completion of generation of the first raster image for the first area to be rendered; and
starting generation a fourth raster image for the fourth area by the second renderer after completion of generation of the second raster image for the second area to be rendered.

2. The image forming method according to claim 1, wherein setting sizes of the third and fourth areas to be rendered comprises setting a number of lines of the third area to be rendered and a number of lines of the fourth area to be rendered according to both the size of the rest of the second area and a size of the second partial area.

3. The image forming method according to claim 2, wherein setting sizes of the third and fourth areas to be rendered is performed by the first renderer.

4. The image forming method according to claim 1, wherein
each of the first and second partial area has an area consisting of lines,
each of the first and second renderers generates raster images on line-by-line basis, and
setting sizes of the third and fourth areas to be rendered comprises setting a number of lines of the third area to be rendered and a number of lines of the fourth area to be rendered according to a number of lines of the rest of the second area.

5. The image forming method according to claim 4, wherein setting sizes of the third and fourth areas to be rendered comprises setting the number of lines of the third area to be rendered and the number of lines of the fourth area to be rendered according to both the number of lines of the rest of the second area and a number of lines of the second partial area.

6. The image forming method according to claim 5, wherein
the number of lines of the third area to be rendered is a half of a sum of the number of lines of the rest of the second area and the number of lines of the second partial area, and
the number of lines of the fourth area to be rendered is a difference between the number of lines of the second partial area and the half of the sum.

7. The image forming method according to claim 4, wherein setting sizes of the third and fourth areas to be rendered comprises detecting the number of lines of the rest of the second area.

8. The image forming method according to claim 1, wherein the first, second, third and fourth areas to be rendered are band areas.

9. The image forming method according to claim 8, wherein the first partial area is an area adjacent to and prior to the second partial area.

10. The image forming method according to claim 1, wherein the first and second partial areas have the same height.

11. An image forming apparatus for generating a raster image of a page including a plurality of partial areas, comprising:
- at least first renderer and second renderer;
- a setting unit configured to set sizes of first and second areas to be rendered by the first renderer and the second renderer, of a first partial area and to set sizes of third and fourth areas to be rendered by the first renderer and the second renderer, of a second partial area,
- wherein the first renderer is configured to start generating a first raster image for the first area, and the second renderer is configured to start generating a second raster image for the second area,
- wherein the setting unit is configured to set the sizes of the third and fourth areas, according to a size of a rest of the second area for which no raster image has been generated at a time of completion of generation of a first raster image for the first area.

12. The image forming apparatus according to claim 11, wherein the setting unit is configured to set the sizes of the third and fourth areas, according to both the size of the rest of the second area and a size of the second partial area.

13. The image forming apparatus according to claim 11, wherein
- each of the first and second partial areas has an area consisting of lines,
- each of the first and second renderers generates raster images on a line-by-line basis, and
- the setting unit is configured to set a number of lines of the third area as the size of the third area and a number of lines of the fourth area as the size of the fourth area, according to a number of lines of the rest of the second area.

14. The image forming apparatus according to claim 13, wherein the setting unit is configured to set the number of lines of the third area and the number of lines of the fourth area, according to both the number of lines of the rest of the second area and a number of lines of the second partial area.

* * * * *